(12) United States Patent
Tsujita et al.

(10) Patent No.: US 11,593,039 B2
(45) Date of Patent: Feb. 28, 2023

(54) PRINTING SYSTEM AND PRINTING METHOD

(71) Applicant: SCREEN HOLDINGS CO., LTD., Kyoto (JP)

(72) Inventors: Masaki Tsujita, Kyoto (JP); Yoshihiko Onogawa, Kyoto (JP); Hiroshi Nishide, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/587,338

(22) Filed: Jan. 28, 2022

(65) Prior Publication Data
US 2022/0269447 A1     Aug. 25, 2022

(30) Foreign Application Priority Data
Feb. 19, 2021   (JP) .............................. JP2021-024855

(51) Int. Cl.
G06F 15/00   (2006.01)
G06F 3/12    (2006.01)
G06K 1/00    (2006.01)

(52) U.S. Cl.
CPC ............ G06F 3/1205 (2013.01); G06F 3/126 (2013.01); G06F 3/1259 (2013.01)

(58) Field of Classification Search
CPC ....... G06F 3/1205; G06F 3/1259; G06F 3/126
USPC ............................. 358/1.15, 1.14, 1.13, 1.1
See application file for complete search history.

(56) References Cited

U.S. PATENT DOCUMENTS

| | | | |
|---|---|---|---|
| 6,206,358 B1 | 3/2001 | Yamaguchi et al. | |
| 2006/0269310 A1* | 11/2006 | German | G03G 15/50 399/82 |
| 2012/0176645 A1 | 7/2012 | Saito | |
| 2015/0278669 A1* | 10/2015 | Akiyama | G06F 3/1222 358/1.14 |
| 2019/0384553 A1* | 12/2019 | Wakamatsu | G06F 3/1275 |

FOREIGN PATENT DOCUMENTS

| | | |
|---|---|---|
| EP | 2 101 255 A2 | 9/2009 |
| JP | 11-105455 A | 4/1999 |

* cited by examiner

*Primary Examiner* — Douglas Q Tran
(74) *Attorney, Agent, or Firm* — McDermott Will & Emery LLP

(57) ABSTRACT

A printing system including a first printer and a second printer is provided with: a job group creation unit that creates a job group defining a plurality of jobs to be grouped and a print order thereof; a job group storage unit that stores information on the print order of the plurality of jobs; a job group updating unit that updates the information on the print order stored in the job group storage unit based on information on an output order when printing is executed by the second printer; and a print instruction unit that instructs the first printer to execute printing based on the plurality of jobs in the print order stored in the job group storage unit.

14 Claims, 21 Drawing Sheets

Fig.5

| JOB GROUP NAME : JG-123 | | |
|---|---|---|
| PRINT ORDER | JOB NAME | PRINT RUN |
| 1 | BOOK-X | 25 |
| 2 | BOOK-Y | 100 |
| 3 | MAP011 | 1 |
| 4 | MAP105 | 60 |
| 5 | | |
| 6 | | |

Fig.12

| JOB NAME | STATUS | DATE AND TIME CREATED |
|---|---|---|
| BOOK003 | UNPROCESSED | 2020/11/15 |
| TEST | UNPROCESSED | 2020/11/12 |
| BOOK520 | RIP DONE | 2020/10/28 |
| TEXT223 | UNPROCESSED | 2020/12/10 |
| MAP02 | RIP DONE | 2020/12/04 |
| TEXT95 | RIP DONE | 2020/10/22 |
| BOOK153 | RIP IN PROGRESS | 2020/11/06 |
| BOOK36 | UNPROCESSED | 2020/11/29 |
| TEXT999 | RIP DONE | 2020/12/01 |

| JOB NAME | ............... | ............... | |
|---|---|---|---|
| BOOK003 | ............... | ............... | ▲ |
| TEST | ............... | ............... | |
| BOOK520 | ............... | ............... | |
| TEXT223 | ............... | ............... | |
| MAP02 | ............... | ............... | |
| TEXT95 | ............... | ............... | |
| BOOK153 | ............... | ............... | |
| BOOK36 | ............... | ............... | |
| TEXT999 | ............... | ............... | ▼ |

PRINTING SYSTEM AND PRINTING METHOD

BACKGROUND OF THE INVENTION

Field of the Invention

The present invention relates to a printing system and a printing method, and more particularly to a printing system and a printing method for performing printing by using a plurality of printers capable of continuous printing based on a plurality of jobs.

Description of Related Art

In general, a book is formed of a body part (hereinafter referred to as a "body") and a cover. In many books, the body and the cover are printed on different types of paper. The printed cover may be subjected to special processing such as laminating or scoring. As described above, since the paper material to be used and the process up to bookbinding are different between the body and the cover, the printing of the body and the printing of the cover are performed using different printers.

Meanwhile, in recent years, in the printing industry, in-line processing has been advanced in order to shorten delivery time and reduce cost. In addition, high-mix small-lot production is often performed, and human work is required more frequently than when small-variety mass production is performed. When human work is required, the cost increases, and the probability of occurrence of a printing accident caused by a work error also increases. Thus, the process from printing to bookbinding is preferably automated as much as possible.

Therefore, at the time of executing continuous printing based on a plurality of jobs for bookbinding, it is conceivable to specify a print order of the plurality of jobs for each of the printer for printing the body (hereinafter referred to as a "body printer") and the printer for printing the cover (hereinafter referred to as a "cover printer"). In this regard, an example in which bookbinding is performed after continuous printing based on four jobs A, B, C, D will be described with reference to FIG. 23. In FIG. 23, bodies corresponding to the jobs A, B, C, and D are denoted by reference numerals A1, B1, C1, and D1, respectively, and covers corresponding to the jobs A, B, C, and D are denoted by reference numerals A2, B2, C2, and D2, respectively. For example, when the bodies are outputted in the order of A1, B1, C1, and D1 from a conveyance device 93 (a conveyance device corresponding to the body printer 91) provided in the preceding stage of the bookbinding machine 95, and the covers are outputted in the order of A2, B2, C2, and D2 from a conveyance device 94 (a conveyance device corresponding to the cover printer 92) provided in the preceding stage of the bookbinding machine 95, bookbinding is performed by correctly combining the bodies and the covers. If the order of the bodies is maintained in a processing device between the body printer 91 and the conveyance device 93, and the order of the covers is reversed in a processing device between the cover printer 92 and the conveyance device 94, the body printer 91 is instructed to print the bodies in the order of A1, B1, C1, and D1, and the cover printer 92 is instructed to print the covers in the order of D2, C2, B2, and A2. When the bodies and the covers are reliably outputted in a desired order from the body printer 91 and the cover printer 92 based on these instructions, the process from the specification of the job to be printed to bookbinding can be automated.

In connection with the present invention, Japanese Laid-Open Patent Publication No. 11-105455 discloses an invention of a bookbinding process device that can prevent bookbinding in a state where the content of a bundle of sheets and the content of a cover are different. In the bookbinding process device, print information including identification information is read from each of the cover and the bundle of sheets by using the information reader, and a bookbinding process is set based on the read print information.

With respect to the printing for bookbinding as described above, a printer that cannot execute print output in a specified order is often adopted particularly for a cover printer. In such a printer, when the execution of continuous printing based on a plurality of jobs is instructed, print output is performed on sheets in the order in which the raster image processor (RIP) process is completed. Therefore, for the example described above, even when the cover printer 92 is instructed to print the covers in the order of D2, C2, B2, and A2, the covers may be outputted from the cover printer 92 in the order of B2, D2, C2, and A2, for example. Then, the body and the cover cannot be correctly combined (a mismatch occurs) when binding is performed by the bookbinding machine 95.

From the above, in the conventional printing system, it is necessary for an operator to manually set the print order in the body printer in accordance with the print order of the covers immediately before printing is executed on the body printer side after the completion of the printing of the covers. The setting of the print order is performed using a screen 97 as schematically shown in FIG. 24. The screen 97 is provided with a rearrangement button 98, and the operator uses the rearrangement button 98 to move jobs up and down to set the print order. However, a list of jobs is displayed on the screen 97 typically in the order of creation (of jobs), so that the order of jobs displayed on the screen 97 and the order of jobs to be printed out are often greatly different, and the rearrangement operation by the operator takes a lot of time. In particular, when the number of jobs is large, the operator needs to perform the rearrangement operation while changing a display portion by using a scroll bar 99, and hence an operation error is likely to occur.

In the invention disclosed in Japanese Laid-Open Patent Publication No. 11-105455, when there is a mismatch between the content of the bundle of sheets and the content of the cover, the bookbinding process is stopped, and work (e.g., work of replacing the cover) by the operator occurs.

SUMMARY OF THE INVENTION

In view of the above circumstances, an object of the present invention is to achieve a printing system that can prevent a mismatch from occurring during bookbinding without imposing an operation burden and a work burden on an operator when bookbinding is performed using printed matters outputted from a plurality of printers.

One aspect of the present invention is directed to a printing system capable of performing continuous printing based on a plurality of jobs, the printing system including:

a first printing unit including a first printer that prints a first element, and configured to sequentially output the first element;

a second printing unit including a second printer that prints a second element, and configured to sequentially output the second element;

a bookbinding machine configured to perform bookbinding by combining the first element outputted from the first printing unit and the second element outputted from the second printing unit;

a job group creation unit configured to create a job group defining a plurality of jobs to be grouped and a print order of the plurality of jobs;

a job group storage unit configured to store information on the plurality of jobs constituting the job group and information on the print order of the plurality of jobs;

a job group updating unit configured to update the information on the print order stored in the job group storage unit on a basis of information on an output order of the second element from the second printing unit in job units when printing based on the plurality of jobs constituting the job group is executed by the second printer; and a print instruction unit configured to instruct the first printer to execute printing such that printing based on the plurality of jobs constituting the job group is executed by the first printer in the print order stored in the job group storage unit.

With such a configuration, a job group that defines a plurality of jobs and a print order of the plurality of jobs is created, and information on the job group is stored into the job group storage unit. When a mismatch has occurred between the output order of the second element in job units when printing based on the plurality of jobs constituting the job group to be printed is executed by the second printer and the print order stored in the job group storage unit, the information on the print order stored in the job group storage unit is updated. Then, the first printer is instructed to execute printing in the print order stored in the job group storage unit. As a result, in whatever order the second printer executes printing based on the plurality of jobs, it is possible to match the input order of the first element (e.g., body of a book) to the bookbinding machine in job units with the input order of the second element (e.g., cover of a book) to the bookbinding machine in job units. From the above, there is achieved a printing system that can prevent a mismatch from occurring at the time of bookbinding without imposing an operation burden and a work burden on the operator when bookbinding is performed using printed matters outputted from the two printers.

Another aspect of the present invention is directed to a printing system including a printer capable of continuous printing based on a plurality of jobs, the printing system including:

a job group creation unit configured to create a job group defining a plurality of jobs to be grouped and a print order of the plurality of jobs;

a job group storage unit configured to store information on the plurality of jobs constituting the job group and information on the print order of the plurality of jobs; and a print instruction unit configured to instruct the printer to execute printing such that printing based on the plurality of jobs constituting the job group is executed in the print order stored in the job group storage unit.

With such a configuration, a job group that defines a plurality of jobs and a print order of the plurality of jobs is created, and information on the job group is stored into the job group storage unit. Then, the printer is instructed to execute printing in the print order stored in the job group storage unit. As a result, continuous printing based on the plurality of jobs is executed in a desired order. For example, in a case where a plurality of paper sizes is used, jobs of the same paper size can be printed collectively, and in a case where a plurality of types of paper is used, jobs of the same type of paper can be printed collectively. From the above, a printing system capable of executing continuous printing based on a plurality of jobs easily in a desired order is achieved.

Still another aspect of the present invention is directed to a printing method in a printing system capable of performing continuous printing based on a plurality of jobs, the printing system having a first printing unit including a first printer that prints a first element, and configured to sequentially output the first element, a second printing unit including a second printer that prints a second element, and configured to sequentially output the second element, and a bookbinding machine configured to perform bookbinding by combining the first element outputted from the first printing unit and the second element outputted from the second printing unit, the printing method including:

a job group creation step of creating a job group that defines a plurality of jobs to be grouped and a print order of the plurality of jobs;

a job group storage step of storing, into a job group storage unit, information on the plurality of jobs constituting the job group and information on the print order of the plurality of jobs;

a job group updating step of updating the information on the print order stored in the job group storage unit on a basis of information on an output order of the second element from the second printing unit in job units when printing based on the plurality of jobs constituting the job group is executed by the second printer; and a print instruction step of instructing the first printer to execute printing such that printing based on the plurality of jobs constituting the job group is executed by the first printer in the print order stored in the job group storage unit.

These and other objects, features, modes, and advantageous effects of the present invention will become more apparent from the following detailed description of the present invention with reference to the accompanying drawings.

BRIEF DESCRIPTION OF THE DRAWINGS

FIG. 5 is a diagram for explaining a job group in the first embodiment.

FIG. 12 is a view showing an example of a job list screen displayed when the instruction to print the body is given in the first embodiment.

DETAILED DESCRIPTION OF PREFERRED EMBODIMENTS

Embodiments of the present invention will be described below with reference to the accompanying drawings.

1. First Embodiment

A first embodiment of the present invention will be described. In a printing system according to the present embodiment, a body and a cover constituting a book are printed by different printers, and bookbinding is performed by using a bookbinding machine to combine the body and the cover obtained by the printing.

1.1 Hardware Configuration of Printing System

Figure 1:
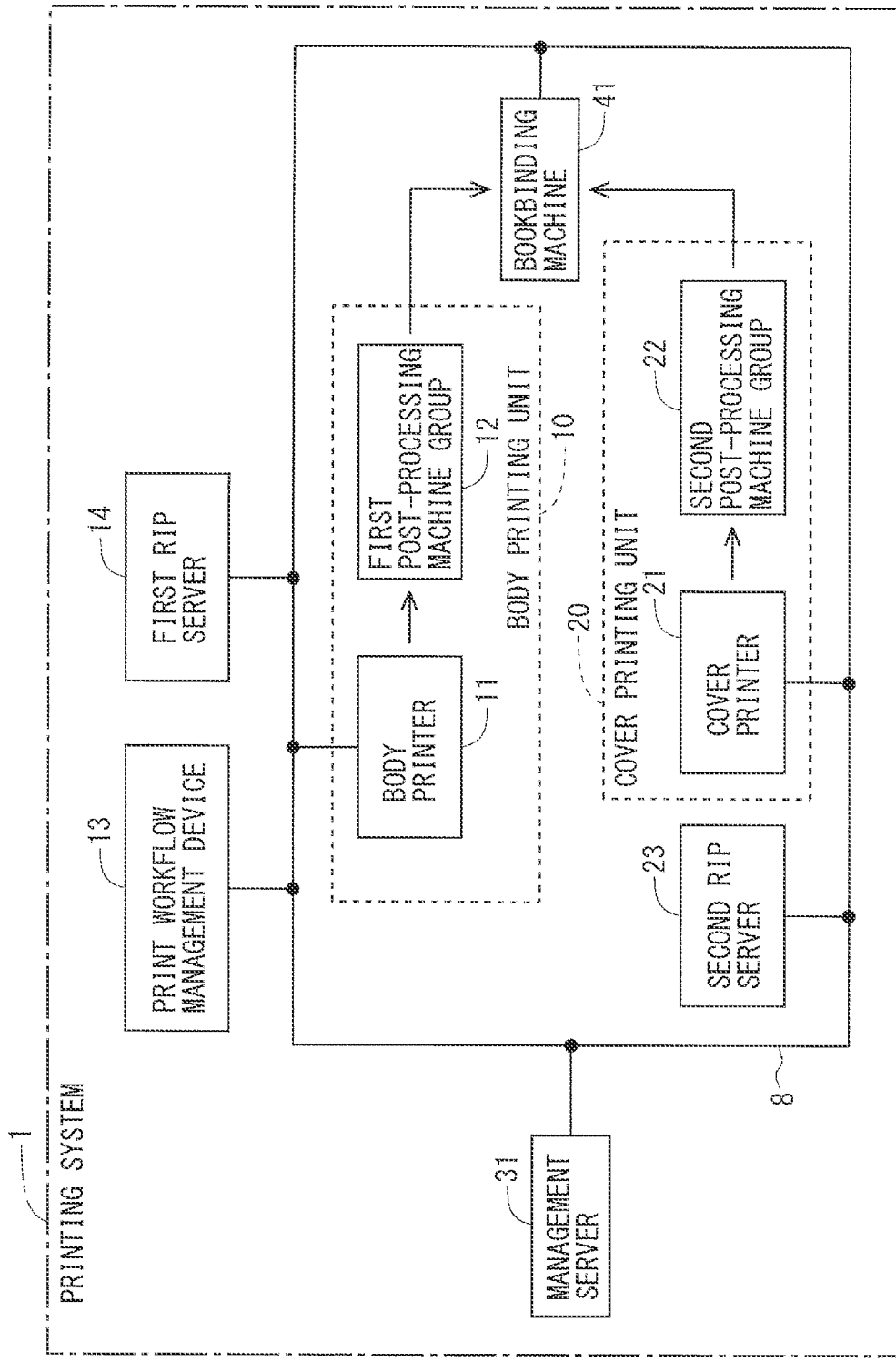
FIG. 1 is a block diagram showing a hardware configuration of a printing system according to a first embodiment of the present invention.

FIG. 1 is a block diagram showing a hardware configuration of a printing system 1 according to the present embodiment. The printing system 1 is formed of a body printer 11, a first post-processing machine group 12, a print workflow management device 13, a first RIP server 14, a cover printer 21, a second post-processing machine group 22, a second RIP server 23, a management server 31, and a bookbinding machine 41. The body printer 11, the first post-processing machine group 12, the print workflow management device 13, and the first RIP server 14 are components related to the printing of the body. The cover printer 21, the second post-processing machine group 22, and the second RIP server 23 are components related to the printing of the cover.

The body printer 11 is schematically formed of a printer main body and a controller thereof. In the present embodiment, the body printer 11 is a continuous printer that performs continuous feed printing on rolled paper and prints the body of a book. The first post-processing machine group 12 is made up of a plurality of devices for post-processing the printed body. A detailed configuration of the first post-processing machine group 12 will be described later. The print workflow management device 13 manages a series of processes for performing printing by using the body printer 11 (i.e., manages print workflow). In this regard, a computer, such as a personal computer in which application software (print workflow management system) for managing the print workflow is installed, functions as the print workflow management device 13. The first RIP server 14 performs a RIP process (rasterization process) on submitted data for body printing, which is data in a vector format.

The cover printer 21 is schematically formed of a printer main body and a controller thereof. In the present embodiment, the cover printer 21 is a sheet-fed printer that performs printing on a sheet of paper and prints the cover of a book. In the present embodiment, when printing a cover, the cover printer 21 prints a barcode on the cover as job identification information. The second post-processing machine group 22 is made up of a plurality of devices for post-processing the printed cover. A detailed configuration of the second post-processing machine group 22 will be described later. The second RIP server 23 performs a RIP process (rasterization process) on submitted data for cover printing, which is data in a vector format.

Bodies of books are sequentially outputted as printed matters from a body printing unit 10 including the body printer 11 and the first post-processing machine group 12. Covers of books are sequentially outputted as printed matters from a cover printing unit 20 including the cover printer 21 and the second post-processing machine group 22. The bookbinding machine 41 performs bookbinding by combining the bodies outputted from the body printing unit 10 and the covers outputted from the cover printing unit 20.

In the management server 31, application software (print operation management system) for managing the entire operation related to printing is installed. Thereby, the management server 31 manages processes related to printing in the body printing unit 10 and the cover printing unit 20. That is, the management server 31 manages the execution of printing by the body printer 11 and the execution of printing by the cover printer 21. The print operation management system is called a "management information system (MIS)". In this regard, originally, although a system that processes information by using a computer for management is called MIS, in the printing industry, a system that not only manages printing instructions to a printer and print result but also manages the entire print operation including order placement, cost management, inventory management, and the like is called MIS.

The body printer 11, the print workflow management device 13, the first RIP server 14, the cover printer 21, the second RIP server 23, the management server 31, and the bookbinding machine 41 are communicably connected by a network 8 such as a local area network (LAN). Submitted data, which is data to be printed, is transmitted from a client computer (not shown) or the like via the network 8.

Although dedicated servers for the RIP process (the first RIP server 14 and the second RIP server 23) are provided in the present embodiment, a configuration in which no dedicated server for the RIP process is provided can also be adopted. Further, although the print workflow management system and the print operation management system are installed in different devices in the present embodiment, a configuration in which the print workflow management system and the print operation management system are installed in the same device may be adopted.

Figure 2:
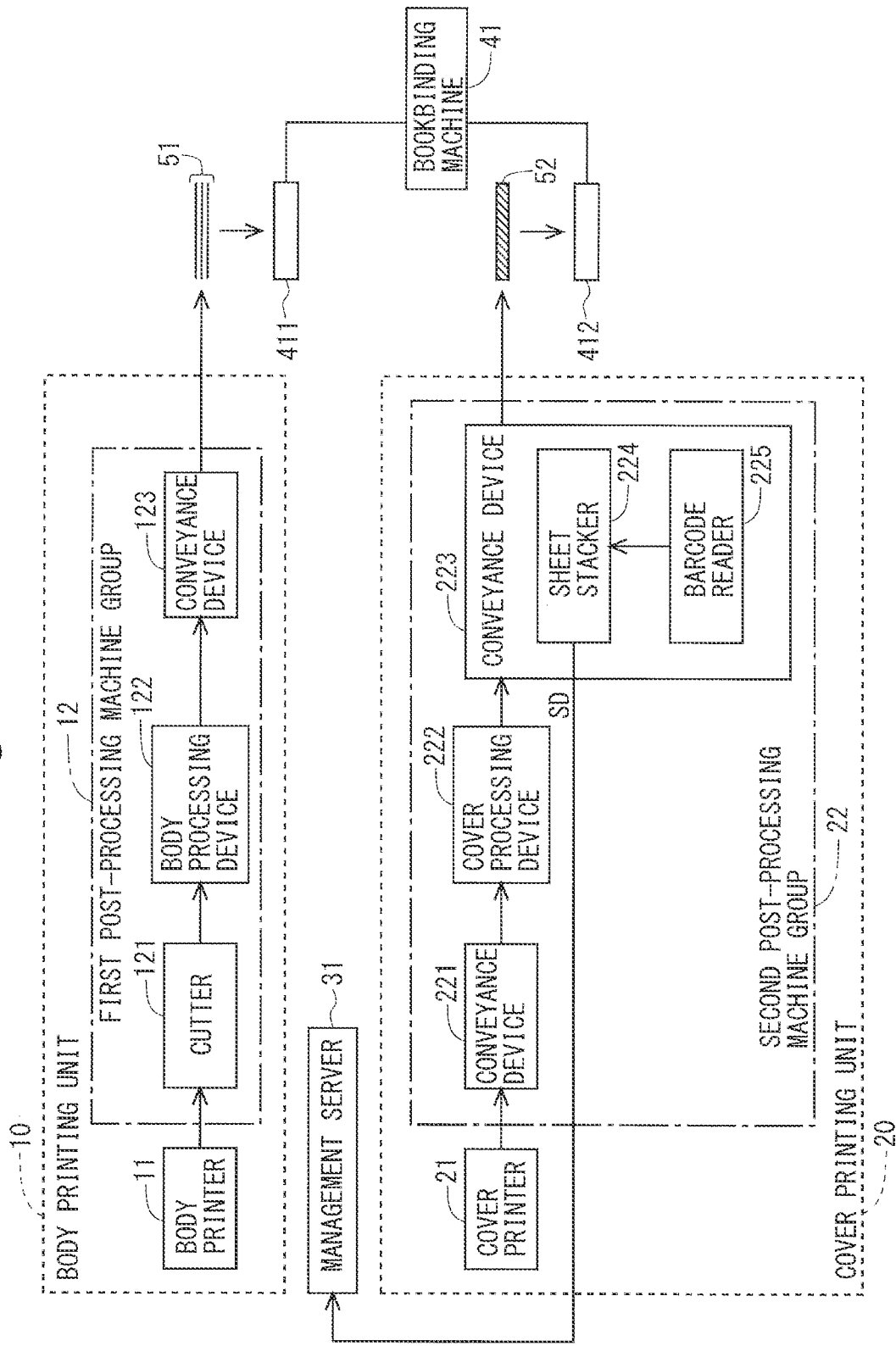
FIG. 2 is a diagram for explaining a configuration between a body printer and a bookbinding machine and a configuration between a cover printer and the bookbinding machine in the first embodiment.

Next, a configuration between the body printer 11 and the bookbinding machine 41 and a configuration between the cover printer 21 and the bookbinding machine 41 (i.e., the configurations of the first post-processing machine group 12 and the second post-processing machine group 22) will be described with reference to FIG. 2. Note that two insertion ports provided in the bookbinding machine 41 are denoted by reference numeral 411 and 412. Bodies 51 in book block units outputted from the body printing unit 10 are sequentially inputted to the insertion port 411, and covers 52 outputted from the cover printing unit 20 are sequentially inputted to the insertion port 412 one by one.

The body printing unit 10 is provided with a cutter 121, a body processing device 122, and a conveyance device 123 as the first post-processing machine group 12 at a subsequent stage of the body printer 11. The cutter 121 pulls out the rolled paper after printing by the body printer 11, from the outside and cuts the rolled paper sequentially to obtain a plurality of bodies. The printed bodies are outputted from the cutter 121 in an overlapping state. The body processing device 122 sequentially takes out the cut bodies in the overlapping state from the top, performs folding or the like, and outputs the bodies in book block units. The conveyance device 123 sequentially conveys the bodies 51 in book block units to the insertion port 411 of the bookbinding machine 41 in the order of processing.

The cover printing unit 20 is provided with a conveyance device 221, a cover processing device 222, and a conveyance device 223 as a second post-processing machine group 22 at a subsequent stage of the cover printer 21. The conveyance device 221 makes a bundle of appropriate number of the overlapped covers after printing by the cover printer 21, and conveys the bundle to the cover processing device 222. The cover processing device 222 performs processing except for printing (e.g., laminating or scoring) on the printed covers. The cover processing device 222 outputs the printed and processed covers one by one. The conveyance device 223 conveys the printed and processed cover 52 one by one to the insertion port 412 of the bookbinding machine 41.

Meanwhile, the conveyance device 223 includes a sheet stacker 224 for stacking printed covers, and a barcode reader 225 attached to the sheet stacker 224. As described above, the cover printer 21 prints a barcode on the cover as the job identification information when printing the cover. The barcode reader 225 reads the barcodes printed on the covers stacked on the sheet stacker 224. The barcode reader 225 achieves a job identification information reading unit. Note that information except for the barcode can also be used as the job identification information, and in this case, a device capable of reading the information is adopted as the job identification information reading unit. The sheet stacker 224 acquires the overlapping order of the covers outputted from the cover processing device 222 (i.e., the covers printed by the cover printer 21) in job units based on the barcode read by the barcode reader 225. Then, the sheet stacker 224 transmits the acquired data indicating the overlapping order (output order in job units) to the management server 31 as order data SD. Note that the order data SD also includes information on the print run in job units.

Figure 3:
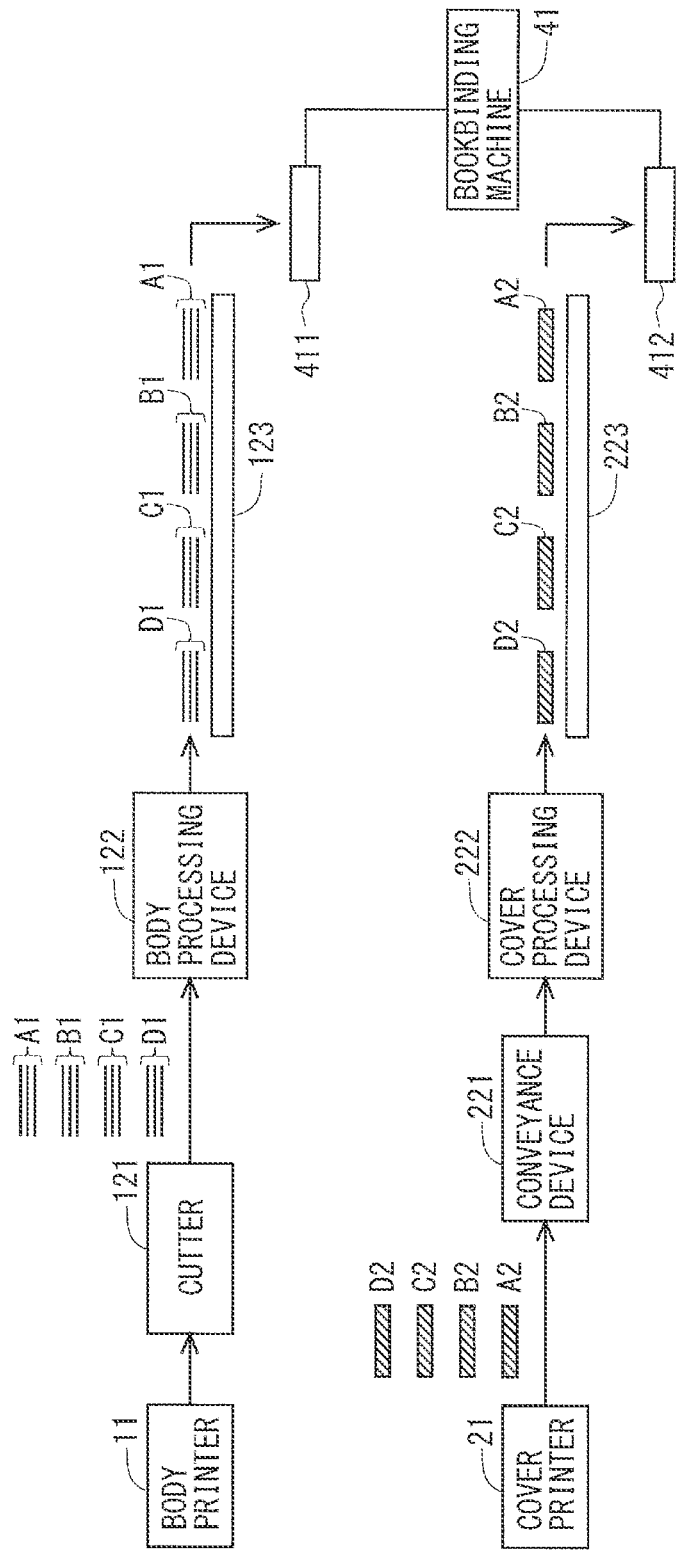
FIG. 3 is a diagram for explaining how the printed bodies and covers are processed and conveyed in the first embodiment.

How the bodies printed by the body printer 11 and the covers printed by the cover printer 21 are processed and conveyed will be described with reference to FIG. 3. Here, a case where four jobs A, B, C, and D are objects to be printed is taken as an example. Each of the jobs A, B, C, and D is a job of printing one book. The bodies corresponding to jobs A, B, C, and D are denoted by reference numerals A1, B1, C1, and D1, respectively, and the covers corresponding to jobs A, B, C, and D are denoted by reference numerals A2, B2, C2, and D2, respectively. It is assumed that printing is performed in the order of A1, B1, C1, and D1 in the body printer 11, and printing is performed in the order of A2, B2, C2, and D2 in the cover printer 21.

When the bodies are printed by the body printer 11, in the printed rolled paper, the previously printed body is included in the inner portion of the rolled paper, and the subsequently printed body is included in the outer portion of the rolled paper. Therefore, regarding the bodies outputted from the cutter 121, the previously printed body is included in the upper portion of the overlap, and the subsequently printed body is included in the lower portion of the overlap. Hence the bodies are outputted from the cutter 121 in the state of overlapping from the top to the bottom in the print order in job units. That is, the bodies are outputted from the cutter 121 in the state of overlapping from the top to the bottom in the order of A1, B1, C1, and D1. The body processing device 122 processes the bodies in the order of A1, B1, C1, and D1, and outputs the bodies in book block units. The conveyance device 123 outputs the bodies in the order of A1, B1, C1, and D1. From the above, the order of the bodies is maintained between the body printer 11 and the insertion port 411 of the bookbinding machine 41.

When the covers are printed by the cover printer 21, in the cover outputted from the cover printer 21, the previous printed cover is included in the lower portion of the overlap, and the subsequently printed cover is included in the upper portion of the overlap. Hence the covers are outputted from the cover printer 21 in the state of overlapping from the top to the bottom in the order reversed to the print order by job units. That is, the covers are outputted from the cover printer 21 in the state of overlapping from the top to the bottom in the order of D2, C2, B2, and A2. The conveyance device 221 does not change the overlapping order of the covers. In the present embodiment, the cover processing device 222 processes the covers in the order of D2, C2, B2, and A2 and outputs the covers in the order reversed to the processing order. That is, the cover processing device 222 outputs the covers in the order of A2, B2, C2, and D2. The conveyance device 223 outputs the covers in the order of A2, B2, C2, and D2.

The bodies are inserted into the insertion port 411 in the order of A1, B1, C1, and D1. The covers are inserted into the insertion port 412 in the order of A2, B2, C2, and D2. The bookbinding machine 41 first performs bookbinding by combining the body A1 and the cover A2. Next, the bookbinding machine 41 performs bookbinding by combining the body B1 and the cover B2. Next, the bookbinding machine 41 performs bookbinding by combining the body C1 and the cover C2. Finally, the bookbinding machine 41 performs bookbinding by combining the body D1 and the cover D2.

In the present embodiment, the first element is achieved by the body of the book, the second element is achieved by the cover of the book, the first printer is achieved by the body printer 11, and the second printer is achieved by the cover printer 21.

1.2 Configuration of Print Workflow Management Device

Figure 4:
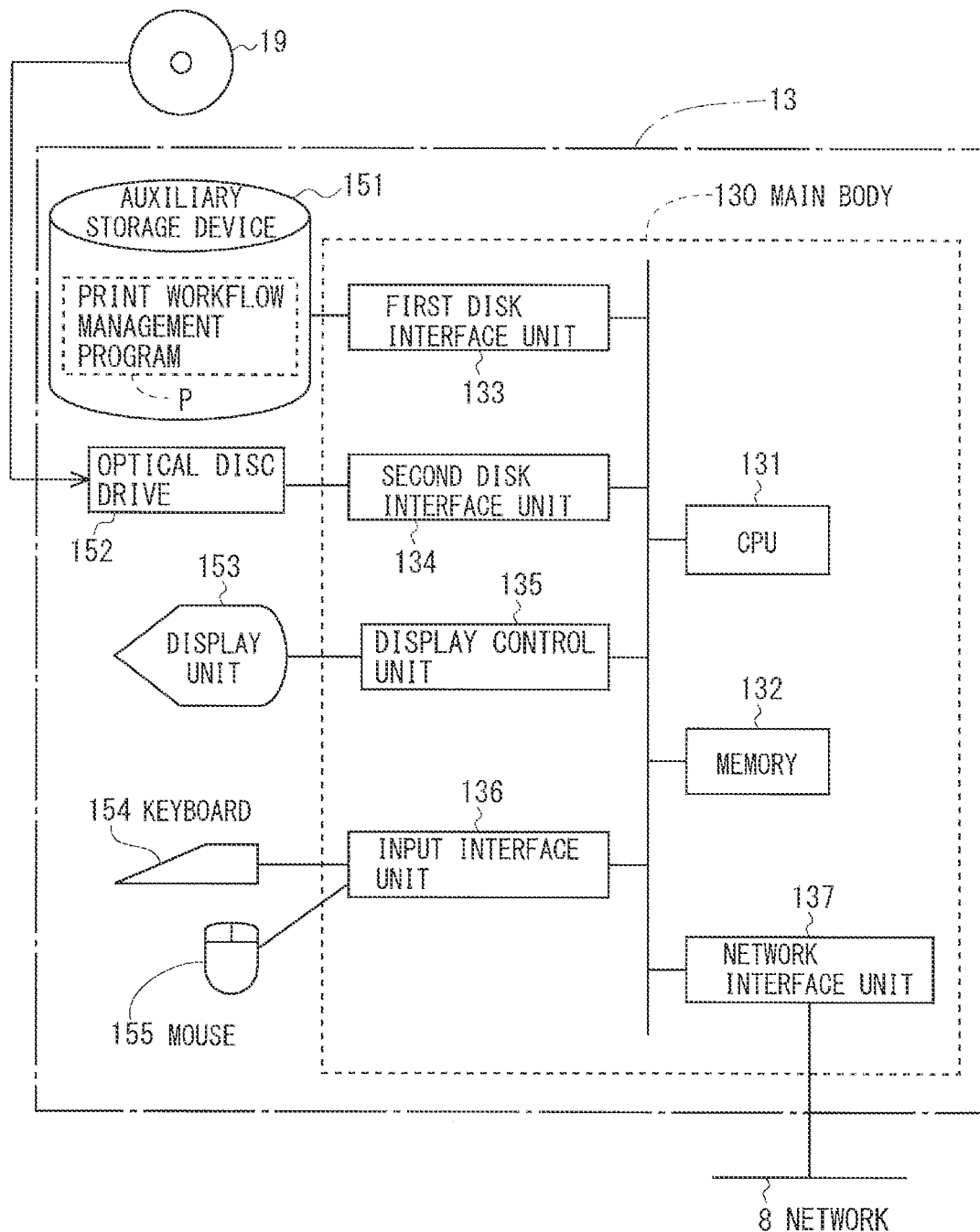
FIG. 4 is a block diagram showing a hardware configuration of a print workflow management device according to the first embodiment.

FIG. 4 is a block diagram showing a hardware configuration of the print workflow management device 13. As shown in FIG. 4, the print workflow management device 13 includes a main body 130, an auxiliary storage device 151, an optical disc drive 152, a display unit 153, a keyboard 154, a mouse 155, and the like. The main body 130 includes a central processing unit (CPU) 131, a memory 132, a first disk interface unit 133, a second disk interface unit 134, a display control unit 135, an input interface unit 136, and a network interface unit 137. The CPU 131, the memory 132, the first disk interface unit 133, the second disk interface unit 134, the display control unit 135, the input interface unit 136, and the network interface unit 137 are connected to each other via a system bus. The auxiliary storage device 151 is connected to the first disk interface unit 133. An optical disc drive 152 is connected to the second disk interface unit 134. A display unit (display device) 153 is connected to the display control unit 135. The keyboard 154 and the mouse 155 are connected to the input interface unit 136. The network 8 is connected to the network interface unit 137. The auxiliary storage device 151 is a magnetic disk device or the like. An optical disc 19 as a computer-readable recording medium, such as a compact disc read-only memory (CD-ROM) or a digital versatile disc read-only memory (DVD-ROM), is inserted into the optical disc drive 152. The display unit 153 is a liquid crystal display or the like. The keyboard 154 and the mouse 155 are used by the operator to input instructions to the print workflow management device 13.

The auxiliary storage device 151 stores a print workflow management program P. The CPU 131 reads the print workflow management program P stored in the auxiliary storage device 151 into the memory 132 and executes the program P, thereby implementing various functions of the print workflow management system for managing a print workflow using the body printer 11. The memory 132 includes random-access memory (RAM) and read-only memory (ROM). The memory 132 functions as a work area for the CPU 131 to execute the print workflow management program P stored in the auxiliary storage device 151. Note that the print workflow management program P is provided by being stored in the computer-readable recording medium (non-transitory recording medium). That is, for example, a user purchases the optical disc 19 as the recording medium of the print workflow management program P, inserts the optical disc into the optical disc drive 152, reads the print workflow management program P from the optical disc 19, and installs the print workflow management program P in the auxiliary storage device 151. Alternatively, the print workflow management program P transmitted via the network 8 may be received by the network interface unit 137 and installed in the auxiliary storage device 151.

1.3 about Job Group

In the present embodiment, a job group in which a plurality of jobs is grouped is determined so as to match the input order (in job units) of the bodies into the insertion port 411 of the bookbinding machine 41 with the input order (in job units) of the cover into the insertion port 412 of the bookbinding machine 41 for a plurality of jobs to be printed. The job group defines a plurality of jobs to be grouped, a print order of the plurality of jobs, and the print run of each of the plurality of jobs. One job group is schematically represented as shown in FIG. 5, for example. In the example shown in FIG. 5, four jobs having job names of "BOOK-X", "BOOK-Y", "MAP011", and "MAP105" constitute one job group named "JG-123". The print order and the print run are determined for each of the four jobs. Note that the print run may not necessarily be determined.

1.4 Functional Configuration

Figure 6:
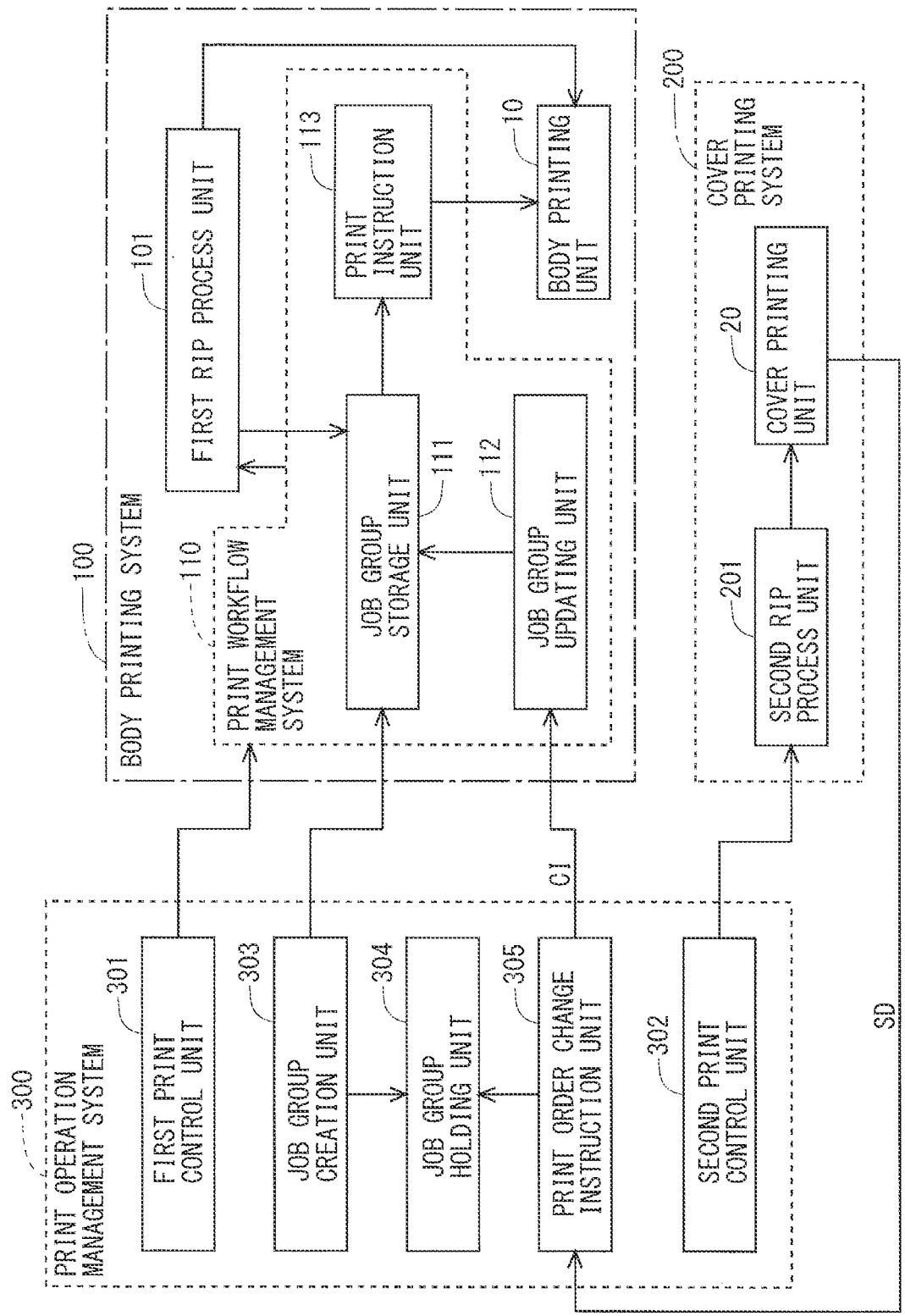
FIG. 6 is a block diagram showing a functional configuration of the printing system according to the first embodiment.

FIG. 6 is a block diagram showing a functional configuration (however, a bookbinding function is excluded) of the printing system 1 according to the present embodiment. The printing system 1 includes a body printing system 100 for printing a body, a cover printing system 200 for printing a cover, and a print operation management system 300 described above. The body printing system 100 includes a first RIP process unit 101, a job group storage unit 111, a job group updating unit 112, a print instruction unit 113, and the body printing unit 10. Note that the function of the first RIP process unit 101 is provided by the first RIP server 14, and the functions of the job group storage unit 111, the job group updating unit 112, and the print instruction unit 113 are provided by a print workflow management system 110. The cover printing system 200 includes a second RIP process unit 201 and the cover printing unit 20. Note that the function of the second RIP process unit 201 is provided by the second RIP server 23. The print operation management system 300 includes a first print control unit 301, a second print control unit 302, a job group creation unit 303, a job group holding unit 304, and a print order change instruction unit 305. Hereinafter, the operation of each component included in the print operation management system 300, the cover printing system 200, and the body printing system 100 will be described in this order.

The first print control unit 301 instructs the print workflow management system 110 to execute print preparation (specifically, the execution of the RIP process) with the specification of a job. The second print control unit 302 instructs the cover printing system 200 to execute printing with the specification of a job. The job group creation unit 303 creates the job group described above based on the operator's operation. The job group holding unit 304 holds information concerning the job group created by the job group creation unit 303 (information on a plurality of jobs constituting the job group, information on the print order of the plurality of jobs, and information on the print run of each of the plurality of jobs). The print order change instruction unit 305 updates the information on the print order and the information on the print run stored in the job group holding unit 304 based on the order data SD (as described above, the order data SD also includes the information on the print run in job units) transmitted from the cover printing unit 20, and outputs a change instruction command CI for changing the print order and the print run of the plurality of jobs constituting the job group.

The second RIP process unit 201 performs the RIP process on submitted data for a cover corresponding to a job to be printed, based on an instruction from the print operation management system 300. The cover printing unit 20 executes the print output of the cover by using the data after the RIP process by the second RIP process unit 201, and further processes the printed cover. When the cover is printed, a barcode for identifying a job is printed on the cover. Then, an order data SD is generated in the conveyance device 223 (see FIG. 2) as described above, and the order data SD is transmitted from the cover printing unit 20 to the print operation management system 300 as data for specifying the print order of the plurality of jobs.

The first RIP process unit 101 performs the RIP process on submitted data for a body corresponding to a job to be printed based on an instruction from the print workflow management system 110. The job group storage unit 111 stores information concerning the job group created by the job group creation unit 303 (information on a plurality of jobs constituting the job group, information on the print order of the plurality of jobs, and information on the print run of each of the plurality of jobs). When the first RIP process unit 101 ends the RIP process for a certain job, information indicating that the RIP process for the job has ended is stored into the job group storage unit 111. The job group updating unit 112 updates the information on the print order and the information on the print run stored in the job group storage unit 111 based on the change instruction command CI transmitted from the print order change instruction unit 305. The print instruction unit 113 instructs the body printer 11 in the body printing unit 10 to execute printing such that printing based on a plurality of jobs constituting a job group to be printed is executed in the print order stored in the job group storage unit 111. In this regard, the print instruction unit 113 is configured to give an instruction to execute printing only when the RIP process by the first RIP process unit 101 has been completed for all of the plurality of jobs constituting the job group to be printed. The body printing unit 10 executes print output of the body by using the data after the RIP process by the first RIP process unit 101, and further processes the printed body.

Although the job group creation unit 303 is provided only in the print operation management system 300 in the present embodiment, the present invention is not limited thereto. It is also possible to adopt a configuration in which the job group creation unit is also provided in the print workflow management system 110.

In order to implement the functions as described above, for example, as a command of a job messaging format (JMF) for exchanging messages between different systems, a command for instructing, from the print operation management system 300 which is a higher-level system to the print workflow management system 110 which is a lower-level system, the print order and the print run for a plurality of jobs is added.

1.5 Process Flow

<1.5.1 Overall Process>

Figure 7:
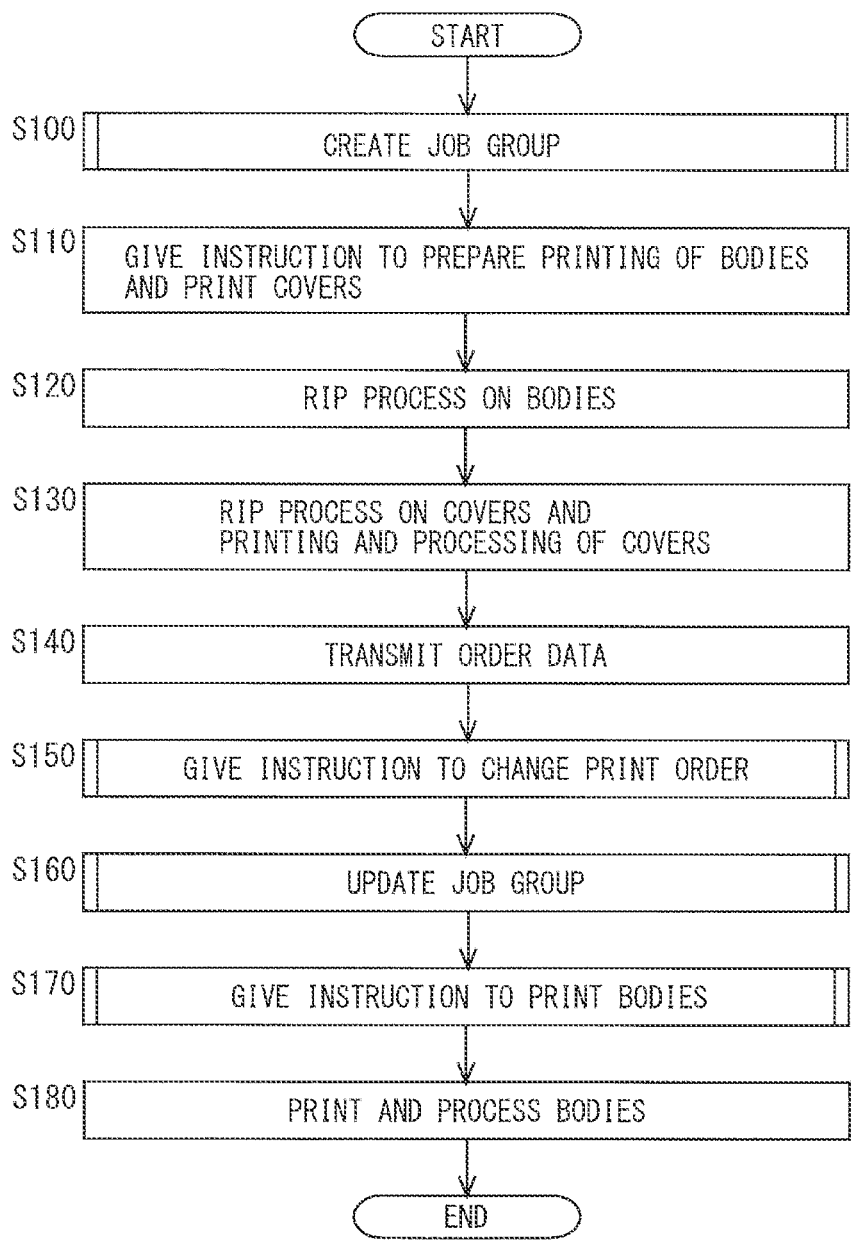
FIG. 7 is a flowchart showing an overall process flow in the first embodiment.

FIG. 7 is a flowchart showing an overall process flow in the present embodiment. First, a job group is created by the job group creation unit 303 (S100). A detailed procedure for step S100 will be described later. After the creation of the job group, the first print control unit 301 instructs the body printing system 100 to execute print preparation, and the second print control unit 302 instructs the cover printing system 200 to execute printing (step S110). As a result, the first RIP process unit 101 performs the RIP process for printing bodies (step S120). The second RIP process unit 201 performs the RIP process for printing covers, and the cover printing unit 20 performs the printing and processing of the covers (step S130). Note that the process in step S130 is not started after the RIP process in step S120 is fully completed, but the process in step S120 and the process in step S130 are performed in parallel. After the completion of the printing of the covers, the order data SD described above is transmitted from the cover printing unit 20 to the print operation management system 300 based on the print result of the cover printing unit 20 (step S140).

Thereafter, the print operation management system 300 instructs the print workflow management system 110 to change the print order (S150). Next, based on the instruction to change the print order, the job group updating unit 112 updates the information on the job group (S160). However, when there is no change in the print order and the print run, the process of step S160 is not performed. Next, the print instruction unit 113 instructs the body printer 11 in the body printing unit 10 to execute the printing of the bodies (step S170). Note that detailed procedures for steps S150, S160, and S170 will be described later. Finally, the body printing unit 10 performs the printing and processing of the bodies (step S180).

<1.5.2 Creation of Job Group>

Figure 8:
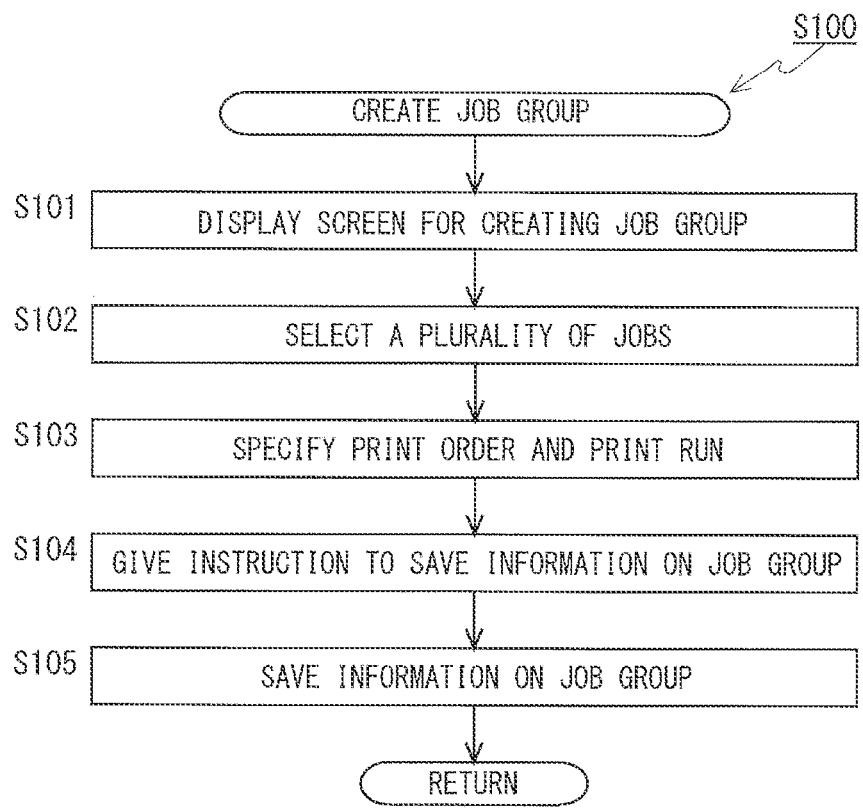
FIG. 8 is a flowchart showing a detailed procedure for creation of a job group in the first embodiment.

A detailed procedure for creation of a job group (step S100 in FIG. 7) will be described with reference to FIG. 8. First, in the management server 31 in which the print operation management system 300 is introduced, a job group creation screen is displayed (step S101). A list of jobs is displayed on the job group creation screen, and the operator selects a plurality of jobs to be grouped (step S102). After selecting the plurality of jobs, the operator specifies the print order of the plurality of jobs and the print run of each of the plurality of jobs (step S103). When an instruction to save the input content is given by the operator, the information on the created job group is saved in the job group holding unit 304, and an instruction to register the information on the created job group is sent from the print operation management system 300 to the print workflow management system 110 (step S104). Thereafter, in the print workflow management system 110, the information on the job group is stored into the job group storage unit 111 based on the instruction sent from the print operation management system 300 (step S105).

<1.5.3 Instruction to Change Print Order>

Figure 9:
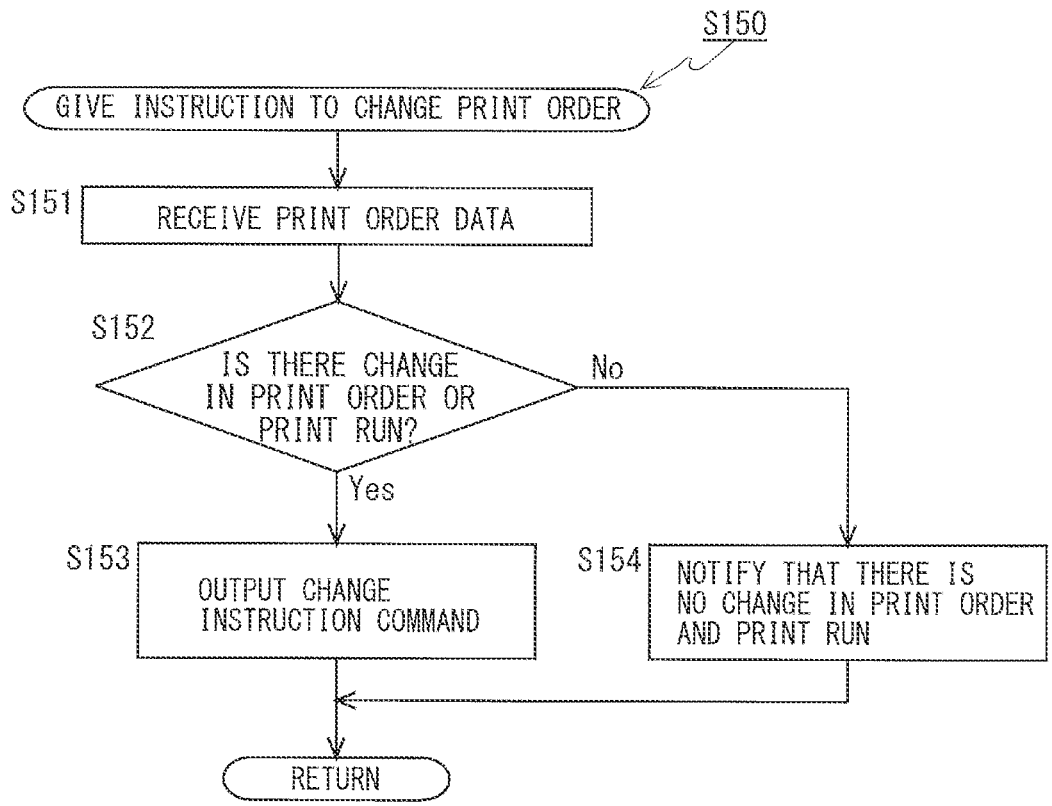
FIG. 9 is a flowchart showing a detailed procedure for an instruction to change a print order in the first embodiment.

A detailed procedure for an instruction to change the print order (step S150 in FIG. 7) will be described with reference to FIG. 9. First, the print operation management system 300 receives an order data SD transmitted from the cover printing unit 20 (step S151). Then, the print order change instruction unit 305 determines whether or not there is a change in the print order or the print run based on the order data SD and the information on the print order and the print run held in the job group holding unit 304 (step S152). As a result, when there is a change in the print order or the print run, the process proceeds to step S153, and when there is no change in the print order and the print run, the process proceeds to step S154. In step S153, the print order change instruction unit 305 outputs the change instruction command CI for changing the print order or the print run to the print workflow management system 110. In step S154, the print order change instruction unit 305 provides notification (hereinafter referred to as "no-change notification") to the print workflow management system 110 that there is no change in the print order and the print run. The print workflow management system 110 can grasp that the printing of the cover has ended by receiving the change instruction command CI or the no-change notification. In a case where the information on the job group does not include the information on the print run, it is determined in step S152 whether or not there is a change in the print order.

The process for an instruction to change the print order (step S150 in FIG. 7) is performed without the operator's operation. The process of updating the job group (step S160 in FIG. 7) is also performed without the operator's operation. From the above, the information on the job group stored in the job group storage unit 111 is automatically updated based on the print result in the cover printer 21.

<1.5.4 Update of Job Group>

Figure 10:
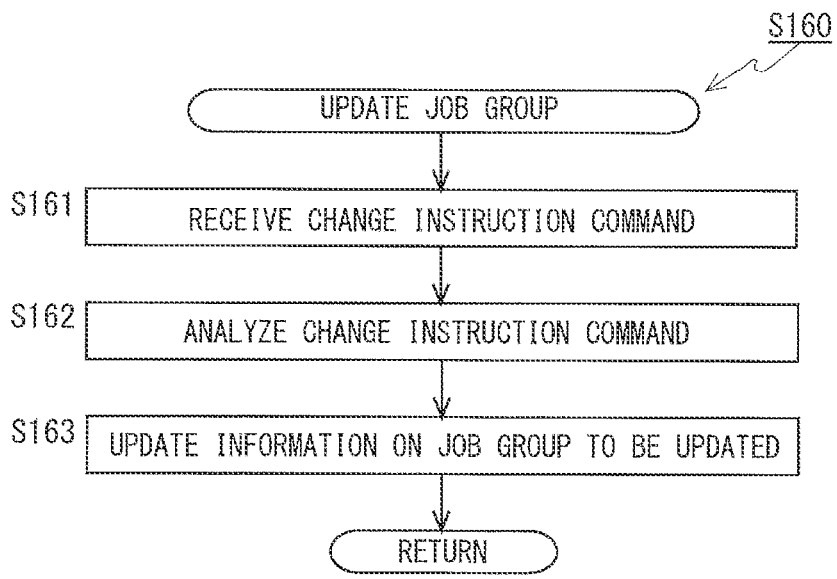
FIG. 10 is a flowchart showing a detailed procedure for updating of the job group in the first embodiment.

A detailed procedure for the updating of the job group (step S160 in FIG. 7) will be described with reference to FIG. 10. First, the job group updating unit 112 receives the change instruction command CI outputted from the print order change instruction unit 305 (step S161). Then, the job group updating unit 112 analyzes the content of the change instruction command CI (step S162). Finally, the job group updating unit 112 updates the information on the job group (the information on the print order and the print run) stored in the job group storage unit 111 based on the analysis result (step S163).

<1.5.5 Instruction to Print Body>

Figure 11:
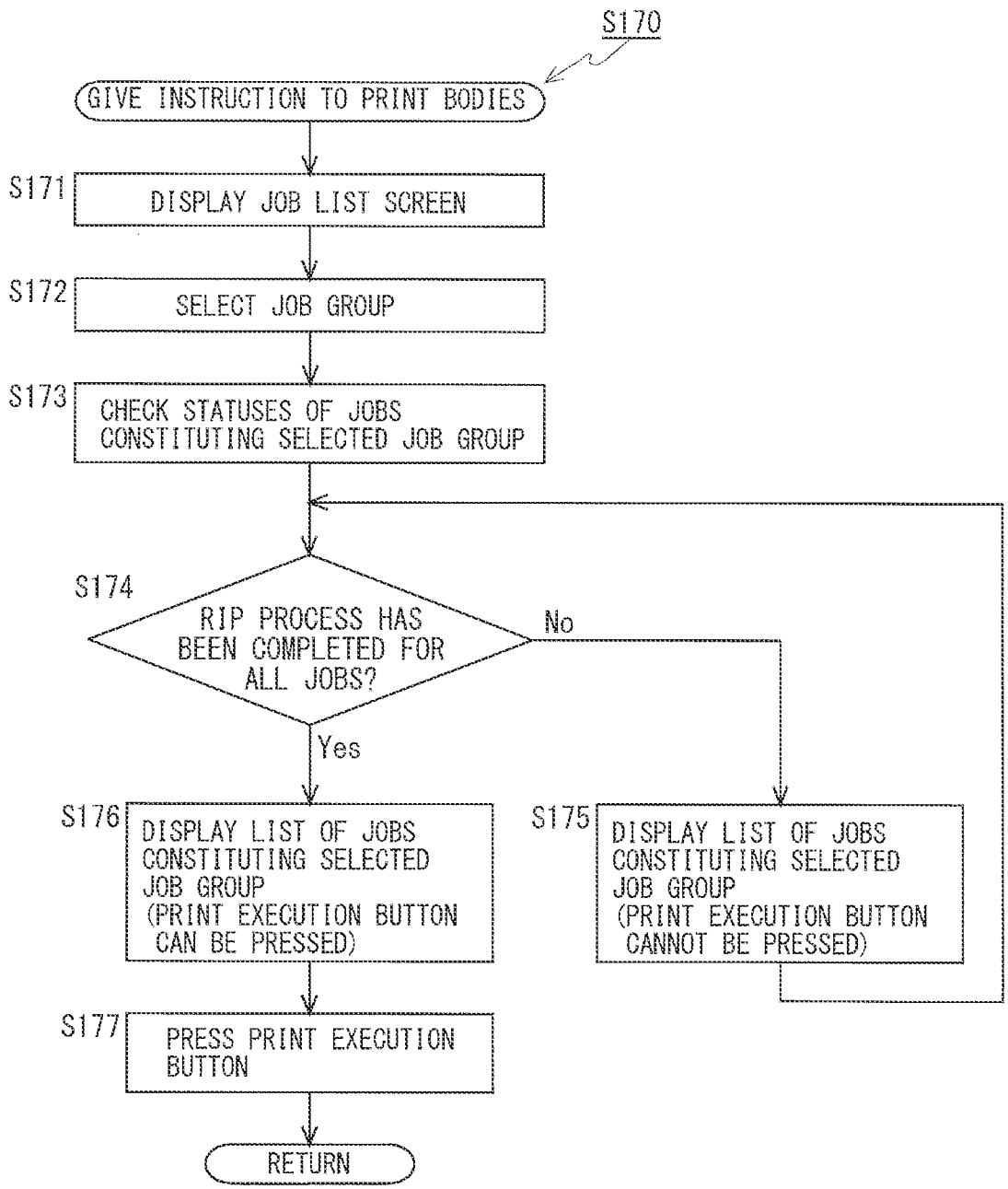
FIG. 11 is a flowchart showing a detailed procedure for an instruction to print bodies in the first embodiment.
Figure 13:
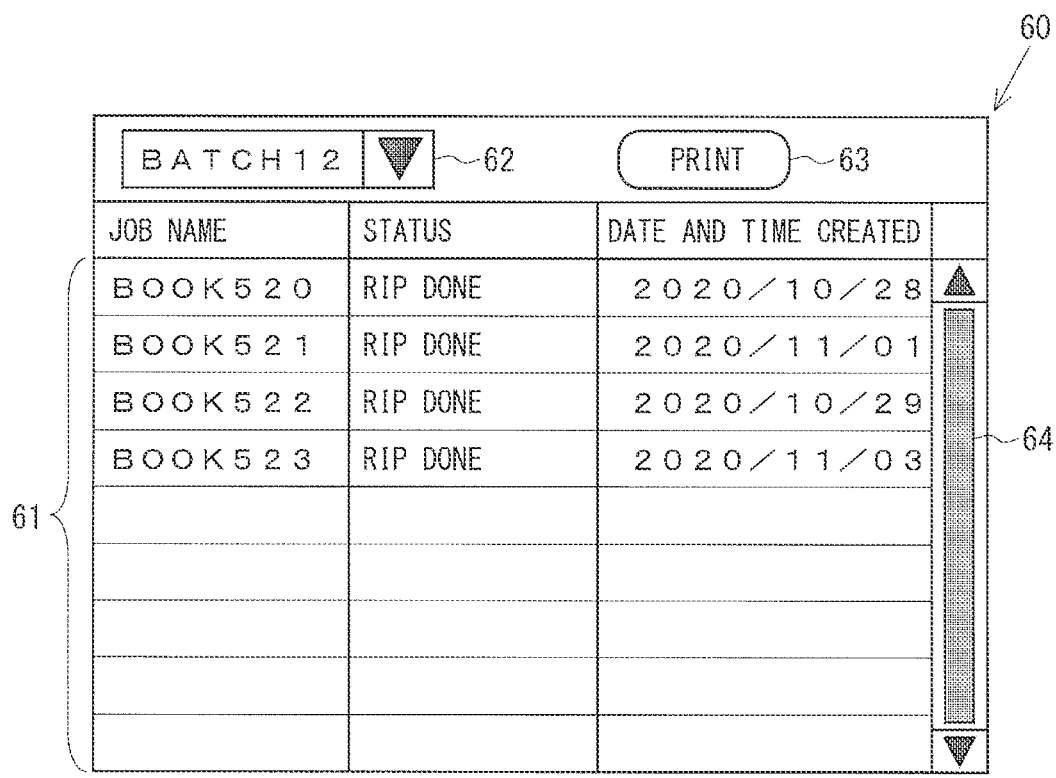
FIG. 13 is a view showing an example of a job list screen after selection of a job group in the first embodiment.

A detailed procedure for an instruction to print the bodies (step S170 in FIG. 7) will be described with reference to FIG. 11. First, a job list screen 60 as shown in FIG. 12, for example, is displayed on the display unit 153 of the print workflow management device 13 (step S171). The job list screen 60 includes a job display area 61, a drop-down list 62, a print execution button 63, and a scroll bar 64. In the initial state, a list of registered jobs is displayed in the job display area 61. The drop-down list 62 is for filtering the display content of the job display area 61. For example, when a job group named "BATCH12" is selected using the drop-down list 62, only information on each of jobs constituting the job group named "BATCH12" is displayed on the job list screen 60 as shown in FIG. 13. The print execution button 63 is a button for instructing the body printer 11 to execute printing based on the job displayed on the job list screen 60.

After the job list screen 60 is displayed, the operator uses the drop-down list 62 to select a job group to be printed (step S172). Next, the print instruction unit 113 checks the statuses of the jobs constituting the job group selected in step S172 (step S173). Then, the print instruction unit 113 determines whether or not the RIP process has been completed for all the jobs constituting the selected job group (step S174). As a result, when the RIP process has been completed for all the jobs, the process proceeds to step S176, and when there is a job for which the RIP process has not been completed, the process proceeds to step S175.

In step S175, a list of jobs constituting the selected job group is displayed in the job display area 61 of the job list screen 60. However, since there is a job for which the RIP process has not been completed, the print execution button 63 cannot be pressed. This prevents the operation of the body printer 11 from stopping due to the absence of data subjected to the RIP process. After the completion of step S175, the process returns to step S174.

In step S176, as in step S175, a list of jobs constituting the selected job group is displayed in the job display area 61 of the job list screen 60. At this time, since the RIP process has been completed for all the jobs constituting the selected job group, the print execution button 63 can be pressed, unlike step S175. Thereafter, the operator presses the print execution button 63 (step S177). Thus, the printing of the bodies in the body printer 11 is started.

1.6 Operation Example

An operation example will be described. It is assumed that the job group to be printed is formed of four jobs A, B, C, and D, and the print order of the four jobs is A, B, C, and D according to the information on the print order stored in the job group storage unit 111. In addition, it is assumed that the print run of the cover outputted from the conveyance device 223 is equal to the print run stored in the job group storage unit 111. Again, the bodies corresponding to jobs A, B, C, and D are denoted by reference numerals A1, B1, C1, and D1, respectively, and the covers corresponding to jobs A, B, C, and D are denoted by reference numerals A2, B2, C2, and D2, respectively.

Figure 14:
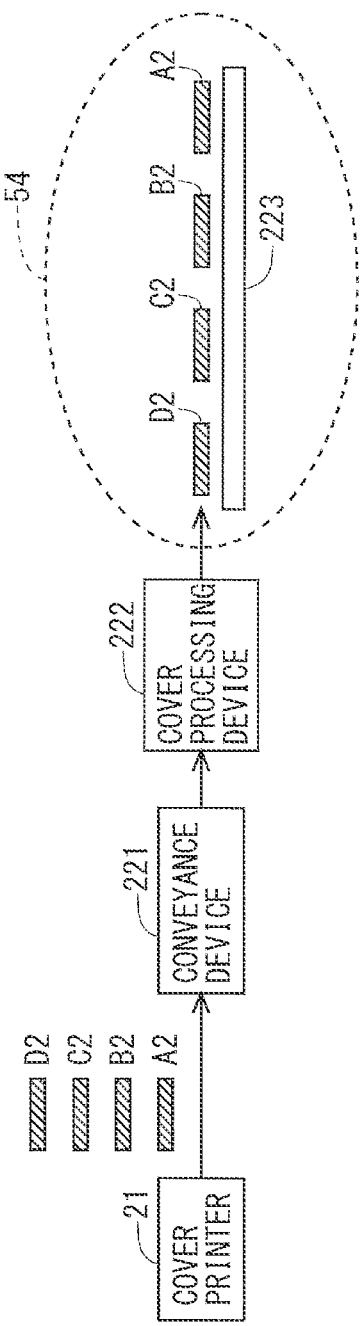
FIG. 14 is a diagram for explaining an operation example in the first embodiment.

First, attention is focused on a case where the covers are outputted from the conveyance device 223 in the order of A2, B2, C2, and D2 as shown in a portion denoted by reference numeral 54 in FIG. 14. In this case, the order data SD indicates that the bodies should be printed in the order of A1, B1, C1, and D1. Thus, the print operation management system 300 determines that there is no change in the print order. Therefore, the information on the print order stored in the job group storage unit 111 is not changed. Thereby, an instruction to print the bodies in the order of A1, B1, C1, and D1 is given from the print instruction unit 113 to the body printer 11. Since the order of the bodies is maintained between the body printer 11 and the insertion port 411 of the bookbinding machine 41 as described above, the bodies are inserted into the insertion port 411 of the bookbinding machine 41 in the order of A1, B1, C1, and D1. In addition, the covers are inserted into the insertion port 412 of the bookbinding machine 41 in the order of A2, B2, C2, and D2. From the above, in the bookbinding machine 41, the bookbinding process of combining the bodies and the covers is performed without causing a mismatch.

Figure 15:
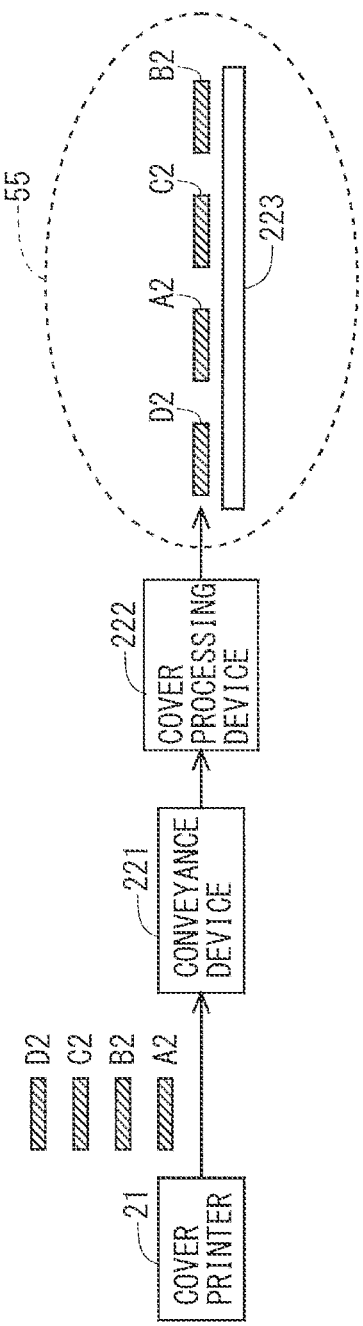
FIG. 15 is a diagram for explaining the operation example in the first embodiment.

Next, attention is focused on a case where the covers are outputted from the conveyance device 223 in the order of B2, C2, A2, and D2 as shown in a portion denoted by reference numeral 55 in FIG. 15. In this case, the order data SD indicates that the bodies should be printed in the order of B1, C1, A1, and D1. Therefore, the print operation management system 300 determines that there is a change in the print order, and the change instruction command CI described above is transmitted from the print operation management system 300 to the print workflow management system 110. As a result, the information on the print order stored in the job group storage unit 111 is changed. Specifically, the information on the print order after the change indicates that the print order of the four jobs is B, C, A, and D. Thereby, an instruction to print the bodies in the order of B1, C1, A1, and D1 is given from the print instruction unit 113 to the body printer 11. Since the order of the bodies is maintained between the body printer 11 and the insertion port 411 of the bookbinding machine 41 as described above, the bodies are inserted into the insertion port 411 of the bookbinding machine 41 in the order of B1, C1, A1, and D1. The covers are inserted into the insertion port 412 of the bookbinding machine 41 in the order of B2, C2, A2, and D2. From the above, in the bookbinding machine 41, the bookbinding process of combining the bodies and the covers is performed without causing a mismatch.

In a case where the order of the bodies is reversed between the body printer 11 and the insertion port 411 of the bookbinding machine 41, for example, when the covers are outputted from the conveyance device 223 in the order of A2, C2, B2, and D2, the information on the print order stored in the job group storage unit 111 is changed such that the bodies are outputted from the body printer 11 in the order of D1, B1, C1, and A1.

1.7 Effects

Figures 23, 24:
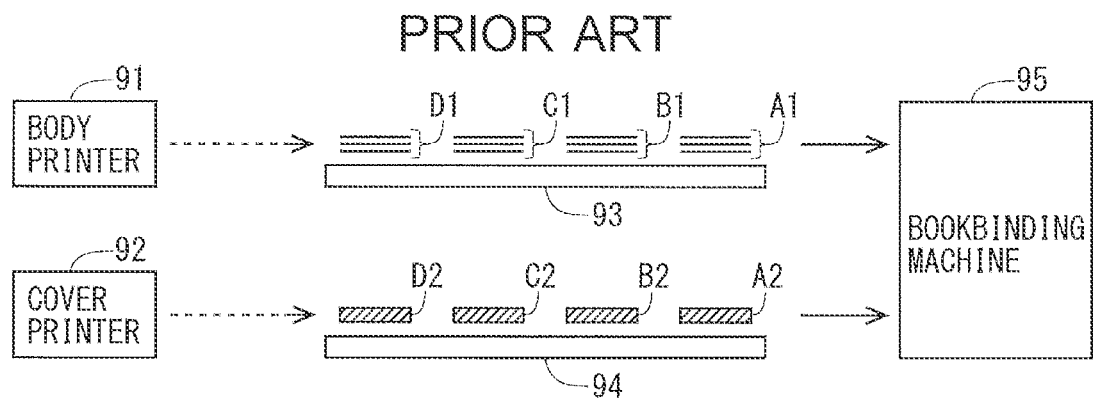
FIG. 23 is a diagram for explaining an example in which bookbinding is performed after continuous printing based on four jobs is performed in a conventional example.
FIG. 24 is a view showing an example of a screen for an operator to set a print order in the conventional example.

According to the present embodiment, a job group that defines a plurality of jobs and a print order of the plurality of jobs is created, and information on the job group is stored into the job group storage unit 111. After the completion of the printing and processing of the covers based on the plurality of jobs constituting the job group to be printed, when the output order of the covers from the cover printing unit 20 is different from the print order stored in the job group storage unit 111, the information on the print order stored in the job group storage unit 111 is updated. Then, the body printer 11 is instructed to execute printing in the print order stored in the job group storage unit 111. As a result, in whatever order the cover printer 21 executes the printing of the covers based on the plurality of jobs, it is possible to match the input order of the bodies to the bookbinding machine 41 in job units with the input order of the covers to the bookbinding machine 41 in job units. Further, when the continuous printing based on the plurality of jobs is executed, it is not necessary to consider the order of the RIP process and the required time, and it is not necessary to take a large amount of time in performing the rearrangement operation by using the screen 97 as shown in FIG. 24, for example. As above, according to the present embodiment, there is achieved the printing system that can prevent a mismatch from occurring at the time of bookbinding without imposing an operation load and a work burden on the operator when bookbinding is performed using printed matters outputted from the two printers (the body printer 11 and the cover printer 21).

Further, for example, information on the base material (printing paper, etc.) and the usage amount of ink can be acquired in a unit preferable for the user by registering the print result for each job group. Moreover, it is easy to collectively transfer a plurality of types of products related to each other.

1.8. Modifications

A modification of the first embodiment will be described below. In the first embodiment, the cover processing device 222 has outputted the covers in the order reversed to the order at the time of processing. In contrast, in the present modification, the cover processing device 222 outputs the covers in the same order as the order at the time of processing.

Figure 16:
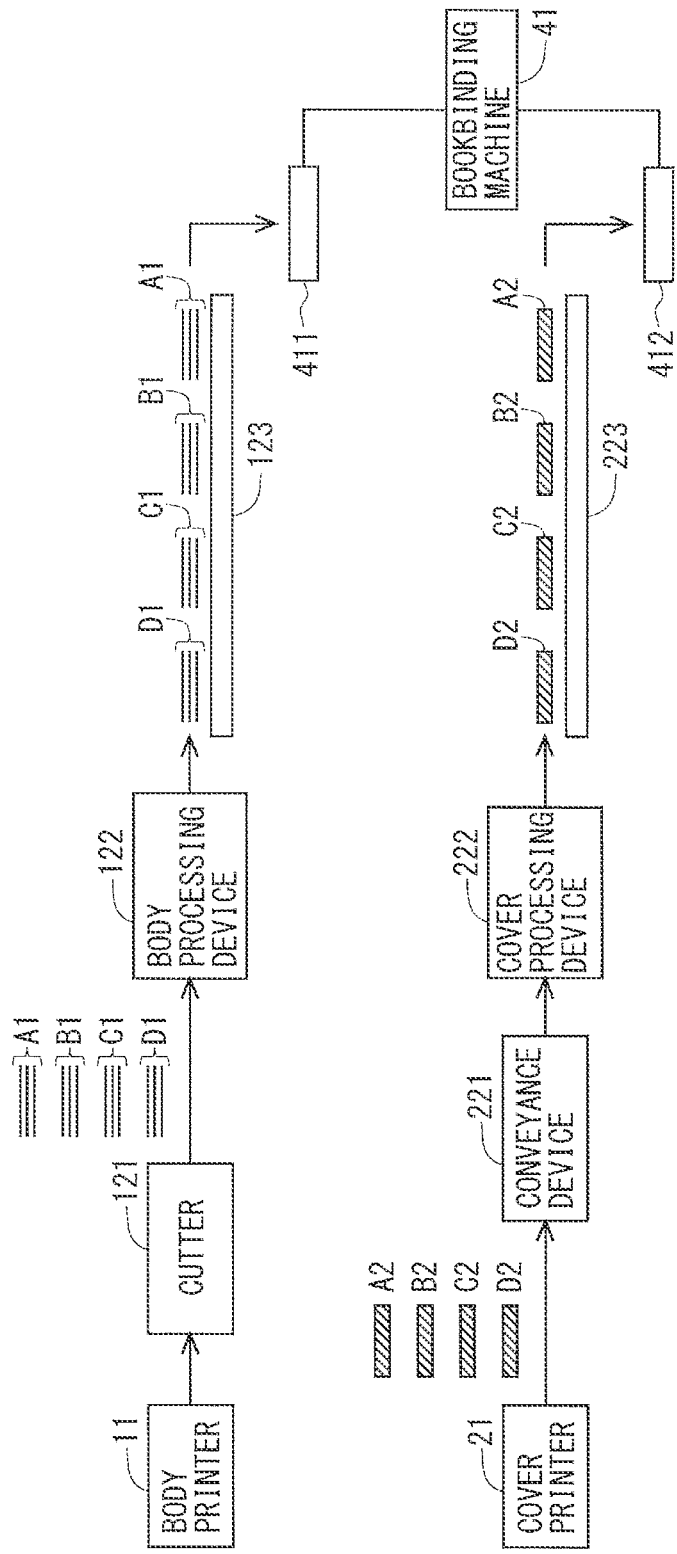
FIG. 16 is a diagram for explaining how the printed bodies and covers are processed and conveyed in a modification of the first embodiment.

How the bodies printed by the body printer 11 and the covers printed by the cover printer 21 are processed and conveyed in the present modification will be described with reference to FIG. 16. Here, it is assumed that the printing is performed in the order of A1, B1, C1, and D1 in the body printer 11, and the printing is performed in the order of D2, C2, B2, and A2 in the cover printer 21.

The bodies printed by the body printer 11 are processed and conveyed in exactly the same manner as in the first embodiment. Thus, the conveyance device 123 outputs the bodies in the order of A1, B1, C1, and D1.

As described above, the cover printer 21 outputs the covers in a state where the covers overlap from the top to the bottom in the order reversed to the print order in job units. Therefore, the covers are outputted from the cover printer 21 in a state where the covers overlap from the top to the bottom in the order of A2, B2, C2, and D2. The conveyance device 221 does not change the overlapping order of the covers. In the present modification, the cover processing device 222 processes the covers in the order of A2, B2, C2, and D2 and outputs the covers in the same order as the processing order. That is, the cover processing device 222 outputs the covers in the order of A2, B2, C2, and D2. The conveyance device 223 outputs the covers in the order of A2, B2, C2, and D2.

From the above, the bodies are inserted into the insertion port 411 of the bookbinding machine 41 in the order of A1, B1, C1, and D1, and the covers are inserted into the insertion port 412 of the bookbinding machine 41 in the order of A2, B2, C2, and D2.

An operation example in the present modification will be described. When the covers are outputted from the conveyance device 223 in the order of A2, B2, C2, and D2 as shown in a portion denoted by reference numeral 54 in FIG. 14, similarly to the first embodiment, the information on the print order stored in the job group storage unit 111 is not changed, and an instruction to print the bodies in the order of A1, B1, C1, and D1 is given from the print instruction unit 113 to the body printer 11. Thereby, the bodies are inserted into the insertion port 411 of the bookbinding machine 41 in the order of A1, B1, C1, and D1. In addition, the covers are inserted into the insertion port 412 of the bookbinding machine 41 in the order of A2, B2, C2, and D2. From the above, in the bookbinding machine 41, the bookbinding process of combining the bodies and the covers is performed without causing a mismatch.

In a case where the covers are outputted from the conveyance device 223 in the order of B2, C2, A2, and D2 as shown in a portion denoted by reference numeral 55 in FIG. 15, similarly to the first embodiment, the information on the print order stored in the job group storage unit 111 is changed, and the information on the print order after the change indicates that the print order of the four jobs is B, C, A, and D. Thereby, an instruction to print the bodies in the order of B1, C1, A1, and D1 is given from the print instruction unit 113 to the body printer 11. As a result, the bodies are inserted into the insertion port 411 of the bookbinding machine 41 in the order of B1, C1, A1, and D1. The covers are inserted into the insertion port 412 of the bookbinding machine 41 in the order of B2, C2, A2, and D2. From the above, in the bookbinding machine 41, the bookbinding process of combining the bodies and the covers is performed without causing a mismatch.

2. Second Embodiment

A second embodiment of the present invention will be described. In the present embodiment as well, similarly to the first embodiment, a body and a cover constituting a book are printed by different printers, and bookbinding is performed by using a bookbinding machine to combine the body and the cover obtained by the printing.

2.1 Hardware Configuration of Printing System

Figure 17:
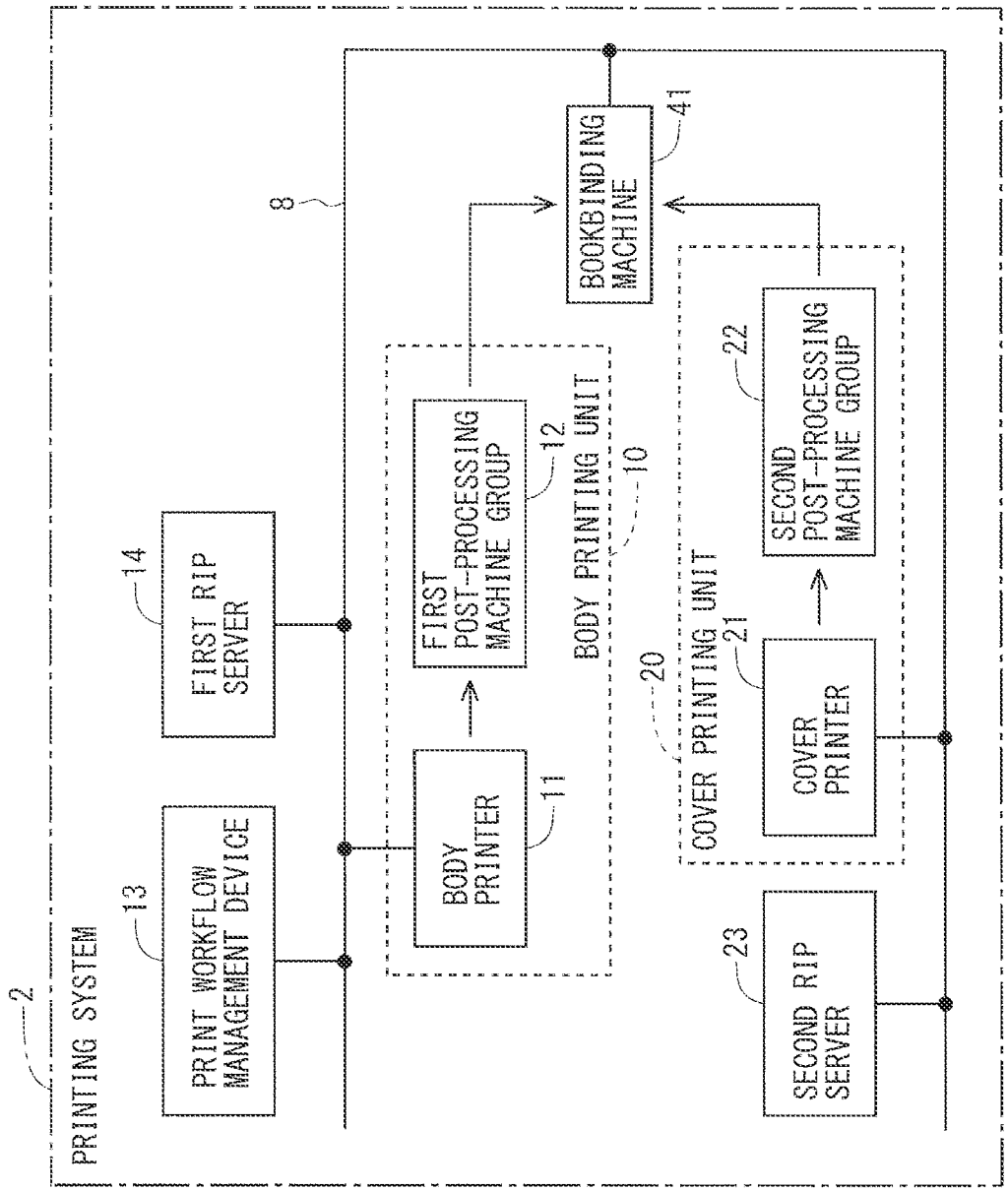
FIG. 17 is a block diagram showing a hardware configuration of a printing system according to a second embodiment of the present invention.

FIG. 17 is a block diagram showing a hardware configuration of a printing system 2 according to the present embodiment. The printing system 2 is formed of a body printer 11, a first post-processing machine group 12, a print workflow management device 13, a first RIP server 14, a cover printer 21, a second post-processing machine group 22, a second RIP server 23, and a bookbinding machine 41. Unlike the first embodiment, the printing system 2 does not include the management server 31. The operation of each component is similar to that of the first embodiment, and hence the description thereof will be omitted.

2.2 Functional Configuration

Figure 18:
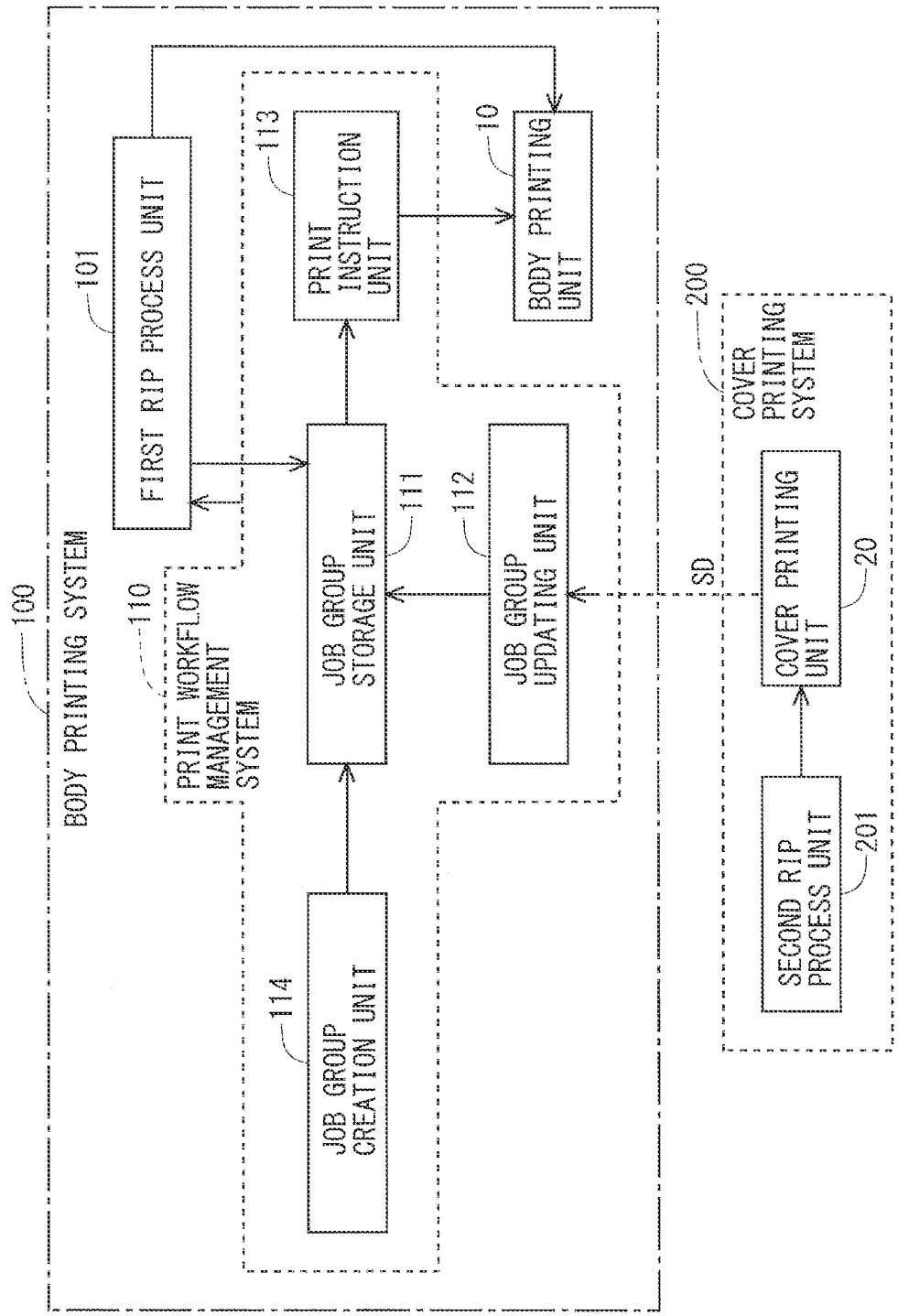
FIG. 18 is a block diagram showing a functional configuration of the printing system according to the second embodiment.

FIG. 18 is a block diagram showing a functional configuration (however, the bookbinding function is excluded) of the printing system 2 according to the present embodiment.

Unlike the first embodiment, the printing system 2 does not include the print operation management system 300. The print workflow management system 110 includes a job group creation unit 114 in addition to the components in the first embodiment. Similarly to the job group creation unit 303 (see FIG. 6) in the first embodiment, the job group creation unit 114 creates a job group based on the operation of the operator. The job group storage unit 111 stores information concerning the job group created by the job group creation unit 114 (information on a plurality of jobs constituting a job group, information on the print order of the plurality of jobs, and information on the print run of each of the plurality of jobs). The cover printing system 200 has the same configuration as that of the first embodiment.

In the present embodiment, since the print operation management system 300 (see FIG. 6) is not included in the printing system 2, the change instruction command CI is not given to the job group updating unit 112. Therefore, the job group updating unit 112 updates the information on the print order and the information on the print run stored in the job group storage unit 111 based on the operator's operation. In this regard, the cover printing unit 20 outputs the order data SD as in the first embodiment. On the basis of the order data SD, the operator specifies the print order and the print run on a predetermined screen for updating the information on the job group. Thereby, the information on the print order and the information on the print run stored in the job group storage unit 111 are updated.

Although not shown in FIG. 18, a component that instructs the print workflow management system 110 to execute print preparation with the specification of a job (a component corresponding to the first print control unit 301 in the first embodiment) and a component that instructs the cover printing system 200 to execute printing with the specification of a job (a component corresponding to the second print control unit 302 in the first embodiment) are provided in the printing system 2.

2.3 Process Flow

Figure 19:
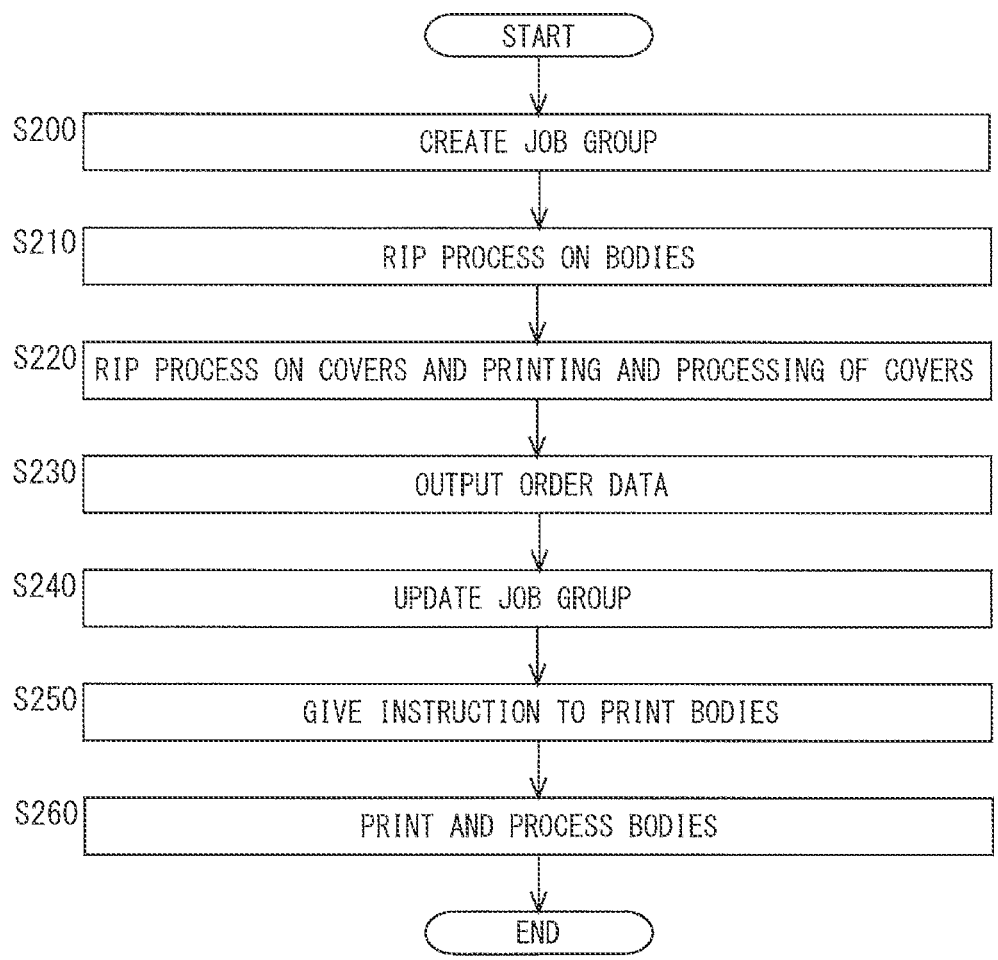
FIG. 19 is a flowchart showing an overall process flow in the second embodiment.

Next, an overall process flow in the present embodiment will be described with reference to a flowchart shown in FIG. 19. First, in the print workflow management system 110, a job group is created by the job group creation unit 114 (S200). Next, the operator gives an instruction to execute the print preparation for the bodies, and the first RIP process unit 101 performs the RIP process for printing the bodies (step S210). In addition, the operator gives an instruction to execute the printing of the cover, and the RIP process for printing the covers by the second RIP process unit 201 and the printing and processing of the cover by the cover printing unit 20 are performed (step S220). Note that the process in step S220 is not started after the RIP process in step S210 is fully completed, but the process in step S210 and the process in step S220 are performed in parallel. After the completion of the printing of the covers, the order data SD is outputted from the cover printing unit 20 based on the print result in the cover printing unit 20 (step S230).

Thereafter, based on the order data SD, the operator inputs the information on the job group (information on the print order and the print run) after update on a predetermined screen. Thereby, the information on the job group is updated (S240). However, in a case where the print order stored in the job group storage unit 111 is the same as the output order indicated by the order data SD, and the print run stored in the job group storage unit 111 is the same as the print run indicated by the order data SD, the process of step S240 is not performed. Next, the print instruction unit 113 instructs the body printer 11 in the body printing unit 10 to execute the printing of the bodies (step S250). Finally, the body printing unit 10 performs the printing and processing of the body (step S260).

2.4 Operation Example

An operation example in the present embodiment will be described using the same example as the example described in the first embodiment.

First, attention is focused on a case where the covers are outputted from the conveyance device 223 in the order of A2, B2, C2, and D2 as shown in a portion denoted by reference numeral 54 in FIG. 14. In this case, the operator understands that the bodies should be printed in the order of A1, B1, C1, and D1, based on the order data SD. That is, the operator understands that there is no change in the print order. Thus, an operation for updating the information on the job group by the operator is not performed. As a result, an instruction to print the bodies in the order of A1, B1, C1, and D1 is given from the print instruction unit 113 to the body printer 11. Thereby, the bodies are inserted into the insertion port 411 of the bookbinding machine 41 in the order of A1, B1, C1, and D1. In addition, the covers are inserted into the insertion port 412 of the bookbinding machine 41 in the order of A2, B2, C2, and D2. From the above, in the bookbinding machine 41, the bookbinding process of combining the bodies and the covers is performed without causing a mismatch.

Next, attention is focused on a case where the covers are outputted from the conveyance device 223 in the order of B2, C2, A2, and D2 as shown in a portion denoted by reference numeral 55 in FIG. 15. In this case, the operator understands that the bodies should be printed in the order of B1, C1, A1, and D1, based on the order data SD. That is, the operator understands that there is a change in the print order. Therefore, the operator inputs the information on the updated print order on a predetermined screen. Thereby, the information on the print order stored in the job group storage unit 111 is changed. As a result, an instruction to print the bodies in the order of B1, C1, A1, and D1 is given from the print instruction unit 113 to the body printer 11. Thus, the bodies are inserted into the insertion port 411 of the bookbinding machine 41 in the order of B1, C1, A1, and D1. The covers are inserted into the insertion port 412 of the bookbinding machine 41 in the order of B2, C2, A2, and D2. From the above, in the bookbinding machine 41, the bookbinding process of combining the bodies and the covers is performed without causing a mismatch.

2.5 Effects

According to the present embodiment, as in the first embodiment, there is achieved the printing system 2 that can prevent a mismatch from occurring at the time of bookbinding without imposing an operation load and a work burden on the operator when bookbinding is performed using printed matters outputted from the two printers (the body printer 11 and the cover printer 21).

2.6. Modifications

Although the information on the job group in the job group storage unit 111 is updated by the operator inputting the information on the job group after update on a predetermined screen based on the order data SD in the second embodiment, the present invention is not limited thereto. The job group updating unit 112 may update the information on the job group in the job group storage unit 111 based on the order data SD without through the operator's operation.

3. Third Embodiment

A third embodiment of the present invention will be described. In the present embodiment, unlike the first embodiment and the second embodiment, bookbinding is performed using printed matters outputted from one printer.

3.1 Hardware Configuration of Printing System

Figure 20:
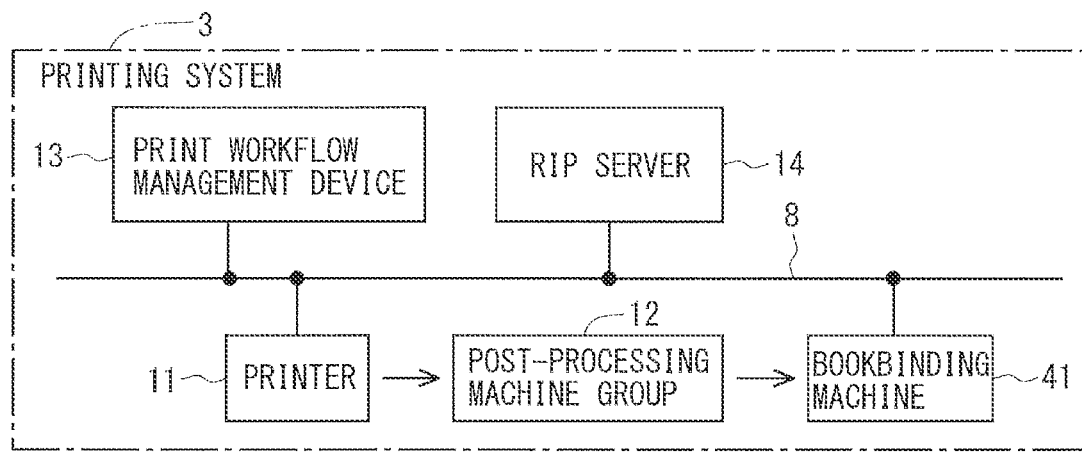
FIG. 20 is a block diagram showing a hardware configuration of a printing system according to a third embodiment of the present invention.

FIG. 20 is a block diagram showing a hardware configuration of the printing system 3 according to the present embodiment. The printing system 3 is formed of a printer 11, a post-processing machine group 12, a print workflow management device 13, a RIP server 14, and a bookbinding machine 41. For convenience, the printer in the present embodiment is denoted by the same reference numeral 11 as that of the body printer in the first embodiment, the post-processing machine group in the present embodiment is denoted by the same reference numeral 12 as that of the first post-processing machine group in the first embodiment, and the RIP server in the present embodiment is denoted by the same reference numeral 14 as that of the first RIP server in the first embodiment.

The printer 11 is schematically formed of a printer main body and a controller thereof. In the present embodiment, the printer 11 is a continuous printer for performing continuous feed printing on rolled paper and prints a booklet without distinction between a body and a cover. The post-processing machine group 12 has the same configuration as the first post-processing machine group 12 in the first embodiment (see FIG. 2) and performs post-processing on a printed matter. The print workflow management device 13 manages a series of processes for performing printing by using the printer 11. The RIP server 14 performs a RIP process (rasterization process) on submitted data for printing, which is data in a vector format. The bookbinding machine 41 performs bookbinding by using the printed matters outputted from the post-processing machine group 12.

3.2 Functional Configuration

Figure 21:
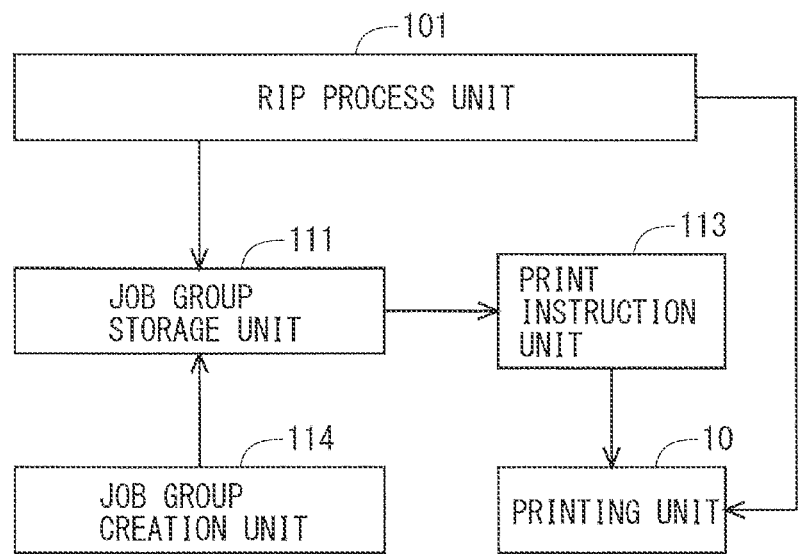
FIG. 21 is a block diagram showing a functional configuration of the printing system according to the third embodiment.

FIG. 21 is a block diagram showing a functional configuration (however, the bookbinding function is excluded) of the printing system 3 according to the present embodiment. As understood from FIGS. 18 and 21, the configuration of the printing system 3 in the present embodiment is a configuration in which the job group updating unit 112 is removed from the body printing system 100 in the second embodiment. However, components similar to those of the job group updating unit 112 in the second embodiment may be provided.

3.3 Process Flow

Figure 22:
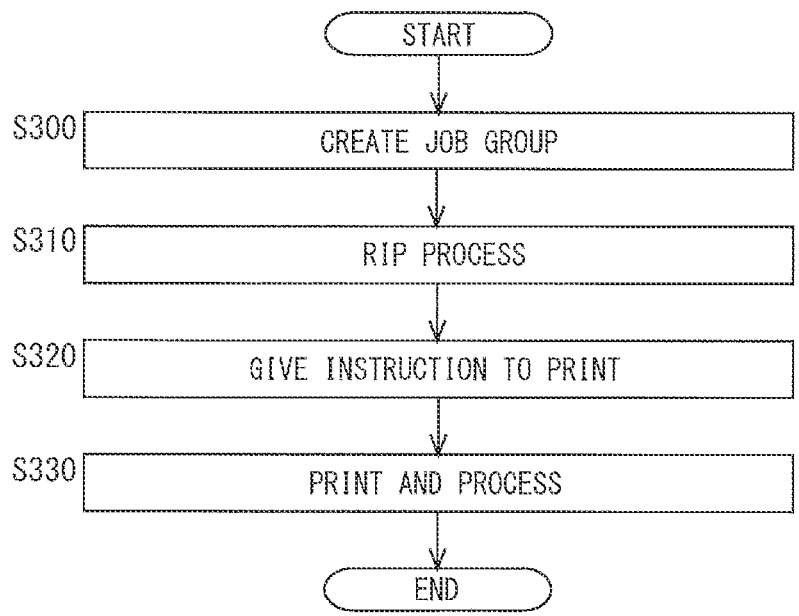
FIG. 22 is a flowchart showing an overall process flow in the third embodiment.

An overall process flow in the present embodiment will be described with reference to a flowchart shown in FIG. 22. First, in the print workflow management device 13, the operator defines a plurality of jobs to be grouped, a print order of the plurality of jobs, and the print run of each of the plurality of jobs on a predetermined screen for creating a job group (see FIG. 5). Thereby, a job group is created by the job group creation unit 114 (S300). The information on the created job group is stored into the job group storage unit 111.

Next, in the print workflow management device 13, the operator gives an instruction to execute print preparation with the specification of a job group to be printed. Thereby, the RIP process unit 101 performs the RIP process on a plurality of jobs constituting the job group to be printed (step S310).

After the completion of the RIP process for all the jobs constituting the job group to be printed, the operator gives an instruction to execute printing in the print workflow management device 13. For example, the operator presses the print execution button 63 on the job list screen 60 shown in FIG. 13. Thereby, the print instruction unit 113 instructs the printer 11 to execute printing (step S320). At this time, the printer 11 is instructed to execute printing based on the plurality of jobs constituting the job group to be printed in the print order stored in the job group storage unit 111.

Finally, printing is performed for the plurality of jobs constituting the job group to be printed by the printer 11 in the order instructed in step S320, and processing is performed on the printed matters by the post-processing machine group 12 (step S330).

3.4 Effects

According to the present embodiment, a job group that defines a plurality of jobs and the print order of the plurality of jobs is created, and information on the job group is stored into the job group storage unit 111. Then, the printer 11 is instructed to execute printing in the print order stored in the job group storage unit 111, and continuous printing based on the plurality of jobs is executed in a desired order. Thus, for example, in a case where a plurality of paper sizes is used, jobs of the same paper size can be printed collectively, and in a case where a plurality of types of paper is used, jobs of the same type of paper can be printed collectively. From the above, according to the present embodiment, a printing system 3 capable of executing continuous printing based on a plurality of jobs easily in a desired order is achieved.

4. Others

The present invention is not limited to the above embodiments (including the modification), and various modifications can be made without departing from the gist of the present invention. For example, although the second element constituting the book is the cover in each of the first embodiment and the second embodiment, the second element may be an element except for the cover (e.g., a page on which a photograph is printed in color, and the like). Further, for example, the body printing unit 10 and the cover printing unit 20 may include devices except for the devices described above. That is, in each of the above embodiments, the body printer 11 is a continuous printer, and the cover printer 21 is a sheet-fed printer, but the present invention is not limited thereto. The configuration may be such that the body printer 11 is a sheet-fed printer and the cover printer 21 is a continuous printer. Both the body printer 11 and the cover printer 21 can be configured as a continuous printer, or both the body printer 11 and the cover printer 21 can be configured as a sheet-fed printer.

This application is an application claiming priority based on Japanese Patent Application No. 2021-024855 entitled "PRINTING SYSTEM AND PRINTING METHOD" filed on Feb. 19, 2021, and the contents of which are herein incorporated by reference.

What is claimed is:

1. A printing system capable of performing continuous printing based on a plurality of jobs, the printing system comprising:
   a first printing unit including a first printer that prints a first element, and configured to sequentially output the first element;
   a second printing unit including a second printer that prints a second element, and configured to sequentially output the second element;
   a bookbinding machine configured to perform bookbinding by combining the first element outputted from the first printing unit and the second element outputted from the second printing unit;
   a job group creation unit configured to create a job group defining a plurality of jobs to be grouped and a print order of the plurality of jobs;
   a job group storage unit configured to store information on the plurality of jobs constituting the job group and information on the print order of the plurality of jobs;
   a job group updating unit configured to update the information on the print order stored in the job group storage unit on a basis of information on an output order of the second element from the second printing unit in job units when printing based on the plurality of jobs constituting the job group is executed by the second printer; and
   a print instruction unit configured to instruct the first printer to execute printing such that printing based on the plurality of jobs constituting the job group is executed by the first printer in the print order stored in the job group storage unit.

2. The printing system according to claim 1, wherein
   the job group further defines information on a print run of each of the plurality of jobs constituting the job group,
   the job group storage unit further stores the information on the print run of each of the plurality of jobs constituting the job group,
   the job group updating unit further updates the information on the print run stored in the job group storage unit in accordance with a number of outputs of the second element from the second printing unit in job units when printing based on the plurality of jobs constituting the job group is performed by the second printer, and
   the print instruction unit specifies a print run of each of the plurality of jobs constituting the job group on a basis of the information on the print run stored in the job group storage unit when the print instruction unit instruct the first printer to execute printing.

3. The printing system according to claim 1, further comprising a rasterization process unit configured to perform a rasterization process,
   wherein the print instruction unit is able to give an instruction to execute printing based on the plurality of jobs constituting the job group only when the rasterization process by the rasterization process unit is completed for all of the plurality of jobs constituting the job group.

4. The printing system according to claim 1, further comprising a print order change instruction unit configured to output a change instruction command for changing the print order of the plurality of jobs constituting the job group,
   wherein the job group updating unit updates the information on the print order stored in the job group storage unit on a basis of the change instruction command outputted from the print order change instruction unit.

5. The printing system according to claim 4, further comprising:
   a print workflow management system configured to manage a series of processes for performing printing by using the first printer; and
   a print operation management system configured to manage execution of printing by the first printer and execution of printing by the second printer, the print operation management system being a higher-level system of the print workflow management system,
   wherein the print workflow management system includes the job group storage unit, the job group updating unit, and the print instruction unit, and
   the print operation management system includes the print order change instruction unit.

6. The printing system according to claim 5, wherein
   order data indicating the output order of the second element from the second printing unit in job units when printing based on the plurality of jobs constituting the job group is executed by the second printer is transmitted from the second printing unit to the print operation management system, and
   the print order change instruction unit outputs the change instruction command on a basis of the order data without through an operator's operation in the print operation management system.

7. The printing system according to claim 6, wherein
   the second printer prints job identification information for identifying a job on the second element when printing the second element,
   the second printing unit includes a job identification information reading unit that reads the job identification information printed on the second element outputted from the second printer, and
   the order data is generated on a basis of a result of the reading of the job identification information by the job identification information reading unit.

8. The printing system according to claim 1, wherein
   the second printing unit outputs order data indicating the output order of the second element from the second printing unit in job units when the printing based on the plurality of jobs constituting the job group is executed by the second printer, and
   the job group updating unit updates the information on the print order stored in the job group storage unit on a basis of the order data.

9. The printing system according to claim 1, wherein
   the print instruction unit displays a job list screen indicating jobs in a list format before giving an instruction to execute printing, and
   when a job group is specified on the job list screen, a plurality of jobs constituting the specified job group are displayed side by side on the job list screen in the print order stored in the job group storage unit.

10. The printing system according to claim 9, wherein on the job list screen, whether the rasterization process is completed is displayed in an identifiable manner for each of the plurality of jobs constituting the specified job group.

11. The printing system according to claim 1, wherein the first element is a body of a book, and the second element is a cover of a book.

12. The printing system according to claim 1, wherein the first printer is a continuous printer, and the second printer is a sheet-fed printer.

13. A printing system including a printer capable of continuous printing based on a plurality of jobs, the printing system comprising:
- a job group creation unit configured to create a job group defining a plurality of jobs to be grouped and a print order of the plurality of jobs;
- a job group storage unit configured to store information on the plurality of jobs constituting the job group and information on the print order of the plurality of jobs; and
- a print instruction unit configured to instruct the printer to execute printing such that printing based on the plurality of jobs constituting the job group is executed in the print order stored in the job group storage unit.

14. A printing method in a printing system capable of performing continuous printing based on a plurality of jobs, the printing system having
- a first printing unit including a first printer that prints a first element, and configured to sequentially output the first element,
- a second printing unit including a second printer that prints a second element, and configured to sequentially output the second element, and
- a bookbinding machine configured to perform bookbinding by combining the first element outputted from the first printing unit and the second element outputted from the second printing unit, the printing method comprising:
- a job group creation step of creating a job group that defines a plurality of jobs to be grouped and a print order of the plurality of jobs;
- a job group storage step of storing, into a job group storage unit, information on the plurality of jobs constituting the job group and information on the print order of the plurality of jobs;
- a job group updating step of updating the information on the print order stored in the job group storage unit on a basis of information on an output order of the second element from the second printing unit in job units when printing based on the plurality of jobs constituting the job group is executed by the second printer; and
- a print instruction step of instructing the first printer to execute printing such that printing based on the plurality of jobs constituting the job group is executed by the first printer in the print order stored in the job group storage unit.

* * * * *